United States Patent
Park et al.

(10) Patent No.: US 9,585,044 B2
(45) Date of Patent: Feb. 28, 2017

(54) CHANNEL STATE INFORMATION TRANSMITTING METHOD AND USER EQUIPMENT, AND CHANNEL STATE INFORMATION RECEIVING METHOD AND BASE STATION

(75) Inventors: Hanjun Park, Anyang-si (KR); Seungmin Lee, Anyang-si (KR); Hyungtae Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 146 days.

(21) Appl. No.: 14/128,467

(22) PCT Filed: Jun. 28, 2012

(86) PCT No.: PCT/KR2012/005101
§ 371 (c)(1),
(2), (4) Date: Dec. 20, 2013

(87) PCT Pub. No.: WO2013/002563
PCT Pub. Date: Jan. 3, 2013

(65) Prior Publication Data
US 2014/0133336 A1  May 15, 2014

Related U.S. Application Data

(60) Provisional application No. 61/502,824, filed on Jun. 29, 2011, provisional application No. 61/526,671, filed on Aug. 23, 2011.

(51) Int. Cl.
H04W 24/10 (2009.01)
H04B 7/02 (2006.01)
(Continued)

(52) U.S. Cl.
CPC ............ *H04W 24/10* (2013.01); *H04B 7/024* (2013.01); *H04B 7/0626* (2013.01); *H04L 5/0007* (2013.01); *H04L 25/0202* (2013.01)

(58) Field of Classification Search
None
See application file for complete search history.

(56) References Cited

U.S. PATENT DOCUMENTS 8,537,911 B2 * 9/2013 Sayana ................. H04L 5/0048
341/173
2010/0254471 A1 * 10/2010 Ko et al. ....................... 375/260
(Continued)

FOREIGN PATENT DOCUMENTS

CN 101873629 10/2010
KR 10-2011-0041972 4/2011
(Continued)

OTHER PUBLICATIONS

European Patent Office Application Serial No. 12804153.0, Search Report dated Apr. 1, 2015, 6 pages.
(Continued)

*Primary Examiner* — Sulaiman Nooristany
(74) *Attorney, Agent, or Firm* — Lee, Hong, Degerman, Kang & Waimey

(57) ABSTRACT

One embodiment of the present invention discloses a method for allowing user equipment (UE), which can receive channel state information reference signals from a plurality of antenna ports, to transmit channel state information to at least one base station that controls the plurality of antenna ports. The method comprises the following steps: receiving power information of each of the plurality of antenna ports from the at least one base station; calculating channel state information on the at least one base station on the basis of the received power information and channel state information reference signals received from the plu-
(Continued)

rality of antenna ports; and transmitting the calculated channel state information to the at least one base station.

12 Claims, 13 Drawing Sheets

(51) Int. Cl.
*H04B 7/06* (2006.01)
*H04L 5/00* (2006.01)
*H04L 25/02* (2006.01)

(56) References Cited

U.S. PATENT DOCUMENTS

| | | |
|---|---|---|
| 2011/0141987 A1 | 6/2011 | Nam et al. |
| 2011/0170427 A1* | 7/2011 | Koivisto ............ H04B 7/022 370/252 |
| 2012/0113830 A1* | 5/2012 | Zhu .................... H04B 7/024 370/252 |
| 2012/0213261 A1* | 8/2012 | Sayana ............... H04L 5/0094 375/224 |
| 2013/0322288 A1* | 12/2013 | Zhang ................. H04B 7/024 370/252 |

FOREIGN PATENT DOCUMENTS

| | | |
|---|---|---|
| WO | 2010/123270 | 10/2010 |
| WO | 2011/013986 | 2/2011 |

OTHER PUBLICATIONS

PCT International Application No. PCT/KR2012/005101, Written Opinion of the International Searching Authority dated Jan. 24, 2013, 17 pages.

The State Intellectual Property Office of the People's Republic of China Application Serial No. 201280032674.9, Office Action dated Dec. 30, 2015, 6 pages.

\* cited by examiner (a)            (b)

CHANNEL STATE INFORMATION TRANSMITTING METHOD AND USER EQUIPMENT, AND CHANNEL STATE INFORMATION RECEIVING METHOD AND BASE STATION

CROSS-REFERENCE TO RELATED APPLICATIONS

This application is the National Stage filing under 35 U.S.C. 371 of International Application No. PCT/KR2012/ 005101, filed on Jun. 28, 2012, which claims the benefit of U.S. Provisional Application Ser. Nos. 61/502,824, filed on Jun. 29, 2011, and 61/526,671, filed on Aug. 23, 2011, the contents of which are all hereby incorporated by reference herein in their entirety.

TECHNICAL FIELD

The present invention relates to a radio communication system, and more particularly, to a method and apparatus for transmitting or receiving channel state information in a multiple input multiple output (MIMO) system for supporting coordinated transmission.

BACKGROUND ART

The emergence and proliferation of various devices such as Machine-to-Machine (M2M) devices conducting M2M communication, smart phones requiring high data throughput, and tablet computers is a driving force behind a very rapid increase in the amount of data required for a cellular network. To meet the requirements of a larger amount of data, carrier aggregation and cognitive radio have been developed to efficiently use more frequency bands, and multi-antenna technology and multi-base station cooperation technology have been developed to increase a data capacity in a limited frequency.

Among these technologies, a coordinated multiple point transmission and reception (CoMP) scheme has been proposed to improve performance of a wireless communication system. It is expected that the CoMP scheme improves performance of a user equipment (UE) at a cell boundary and average sector throughput. However, although the CoMP scheme is applied, inter-cell interference (ICI) whereby the performance of a UE at a cell boundary is still present, and issues arise in terms of channel estimation of a UE served to provide a communication service via the CoMP scheme.

DISCLOSURE

Technical Problem

To maximize efficiency of a transmission and reception scheme such as a coordinated multi-point transmission and reception (CoMP) scheme, it is required to accurately estimate a channel state between a base station (BS) and a user equipment (UE). However, so far, a method of acquiring channel state information about a wireless communication system for serving the CoMP scheme has not been defined. Accordingly, an object of the present invention devised to solve the problem lies in a method of measuring and reporting channel state information about a plurality of BSs or a plurality of antenna ports by a UE for the CoMP scheme.

It is to be understood that both the foregoing general description and the following detailed description of the present invention are exemplary and explanatory and are intended to provide further explanation of the invention as claimed.

Technical Solution

The object of the present invention can be achieved by providing a method of transmitting channel state information (CSI) to at least one base station for controlling a plurality of antenna ports by a user equipment (UE) for receiving a channel state information reference signal (CSI-RS) from the plural antenna ports, the method including receiving power information about each of the plural antenna ports from the at least one base station, calculating CSI about the at least one base station based on the received power information and the CSI-RSs received from the plural antenna ports, and transmitting the calculated channel station information to the at least one base station.

The power information about the plural antenna ports may include a ratio of downlink (DL) data transmission power to CSI-RS transmission power of each antenna port.

The power information about each of the plural antenna ports may be received via a higher layer signal.

The receiving may include receiving information about an antenna port for transmitting CSI-RS at zero power, from the at least one base station.

CSI-RS configurations for the CSI-RS may be the same or different per base station or antenna port.

In another aspect of the present invention, provided herein is a user equipment (UE) for receiving a channel state information reference signal (CSI-RS) from a plurality of antenna ports and transmitting channel state information (CSI) to at least one base station for controlling a plurality of antenna ports, the UE including a radio frequency (RF) unit configured to transmit or receive a radio signal, and a processor configured to control the RF unit, wherein the processor controls the RF unit to receive power information about each of the plural antenna ports from the at least one base station, calculates CSI about the at least one base station based on the received power information and the CSI-RSs received from the plural antenna ports, and controls the RF unit to transmit the calculated CSI to the at least one base station.

The power information about the plural antenna ports may include a ratio of downlink (DL) data transmission power to CSI-RS transmission power of each antenna port.

The power information about each of the plural antenna ports may be received via a higher layer signal.

The processor may control the RF unit to receive information about an antenna port for transmitting CSI-RS at zero power, from the at least one base station.

CSI-RS configurations for the CSI-RS may be the same or different per base station or antenna port.

In another aspect of the present invention, provided herein is a method of receiving channel state information (CSI) from a user equipment (UE) by a base station for transmitting a channel state information reference signal (CSI-RS) to the UE through a plurality of antenna ports, the method including transmitting power information about each of the plural antenna ports to the UE, controlling the plural antenna ports to transmit the CSI-RS according to the power information, and receiving CSI about the base station, calculated based on the power information and the CSI-RSs, from the UE.

The power information about the plural antenna ports may include a ratio of downlink (DL) data transmission power to CSI-RS transmission power of each antenna port.

In another aspect of the present invention, provided herein is a base station for transmitting a channel state information reference signal (CSI-RS) to a user equipment (UE) through a plurality of antenna ports and receiving channel state information from the UE, the base station including a radio frequency (RF) unit configured to transmit or receive a radio signal, and a processor configured to control the RF unit, wherein the processor controls the RF unit to transmit power information about each of the plural antenna ports to the UE, controls the plural antenna ports to transmit a CSI-RS according to the power information, and controls the RF unit to receive CSI about the BS, calculated based on the power information and the CSI-RSs, from the UE.

The power information about the plural antenna ports may include a ratio of downlink (DL) data transmission power to CSI-RS transmission power of each antenna port.

It is to be understood that both the foregoing general description and the following detailed description of the present invention are exemplary and explanatory and are intended to provide further explanation of the invention as claimed.

Advantageous Effects

According to the present invention, a user equipment (UE) may more accurately measure a channel state between the UE and a base station (BS) or antenna port connected to the UE and report the channel state to the BS or a BS controller. In addition, the BS or BS controller that receives the accurately measured channel state information may accurately recognize the channel state, thereby increasing communication efficiency with the UE that is connected to be communicable with the BS.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
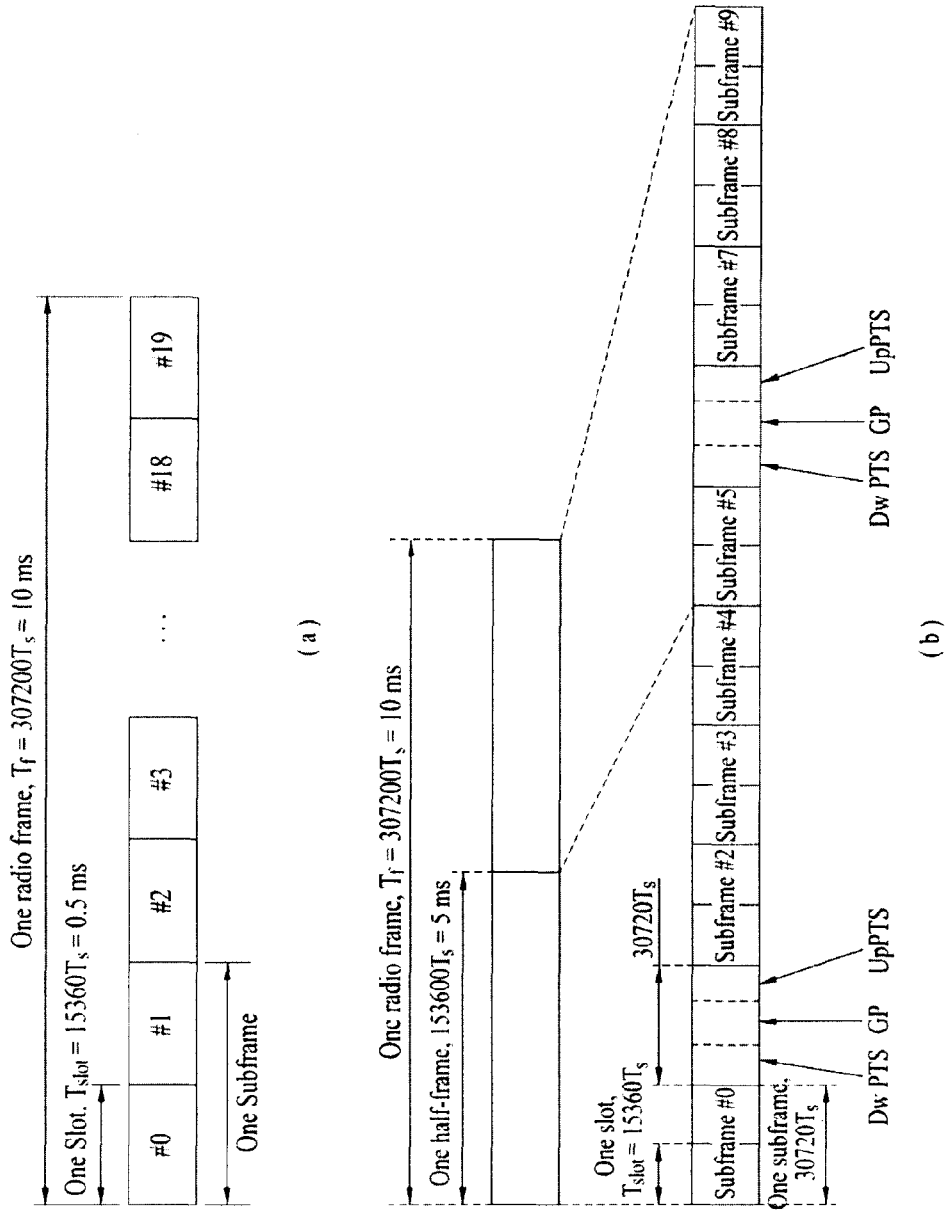
FIG. 1 illustrates exemplary radio frame structures in a wireless communication system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Techniques, devices, and systems as set forth below are applicable to various wireless multiple access systems. For clarity, this application focuses on a $3^{rd}$ generation partnership project long term evolution (3GPP LTE) or LTE-Advanced (LTE-A) system. However, the technical features of the present invention are not limited thereto. For example, even though the following description is given in the context of the 3GPP LTE or LTE-A system as a mobile communication system, the same thing applies to other mobile communication systems, except for features inherent to 3GPP LTE or LTE-A.

In some instances, known structures and devices are omitted or are shown in block diagram form, focusing on important features of the structures and devices, so as not to obscure the concept of the invention. The same reference numbers will be used throughout this specification to refer to the same parts.

In the present invention, a user equipment (UE) is fixed or mobile. The UE is a device that transmits and receives user data and/or control information by communicating with a base station (BS). The term 'UE' may be replaced with 'terminal equipment', 'mobile station (MS)', 'mobile terminal (MT)', 'user terminal (UT)', 'subscriber station (SS)', 'wireless device', 'personal digital assistant (PDA)', 'wireless modem', 'handheld device', etc. A BS is typically a fixed station that communicates with a UE and/or another BS. The BS exchanges data and control information with a UE and another BS. The term 'BS' may be replaced with 'advanced base station (ABS)', 'Node B (NB)', 'evolved-Node B (eNB or eNode B)', 'base transceiver system (BTS)', 'access point (AP)', 'processing server (PS)', etc.

In the present invention, a physical downlink control channel (PDCCH), a physical control format indicator channel (PCFICH), a physical hybrid automatic repeat request indicator channel (PHICH), and a physical downlink shared channel (PDSCH) is sets of time-frequency resources or sets of resource elements (REs) that carry downlink control information (DCI), a control format indicator (CFI), DL acknowledgement/negative ACK (ACK/NACK), and DL data, respectively. A physical uplink control channel (PUCCH) and a physical uplink shared channel (PUSCH) are sets of time-frequency resources or sets of REs that carry uplink control information (UCI) and UL data, respectively. Particularly, time-frequency resources or REs allocated or belonging to the PDCCH, PCFICH, PHICH, PDSCH, PUCCH, and PUSCH are referred to as PDCCH, PCFICH, PHICH, PDSCH, PUCCH, and PUSCH REs or PDCCH, PCFICH, PHICH, PDSCH, PUCCH, and PUSCH resources, respectively in the present invention. Accordingly, PUCCH or PUSCH transmission of a UE amounts to transmission of UL control information, UL data, or a random access signal on the PUSCH or the PUCCH from the UE in the present invention. In addition, transmission of the PDCCH, PCFICH, PHICH, or PDSCH from a BS amounts to transmission of DL data or DL control information on the PDCCH, PCFICH, PHICH, or PDSCH from the BS.

In the present invention, cell-specific reference signal (CRS), demodulation reference signal (DMRS), and channel state information reference signal (CSI-RS) time-frequency resources (or REs) refer to REs that can be allocated or that are available to a CRS, DMRS, and CSI-RS, respectively or time-frequency resources (or REs) that carry the CRS, DMRS, and CSI-RS, respectively. Subcarriers having the CRS REs, DMRS REs, and CSI-RS REs are referred to as CRS, DMRS, and CSI-RS subcarriers, respectively, and orthogonal frequency division multiplexing (OFDM) symbols having the CRS REs, DMRS REs, and CSI-RS REs are referred to as CRS, DMRS, and CSI-RS symbols, respectively. In the present invention, SRS time-frequency resources (or REs) refer to time-frequency resources (or REs) carrying a sounding reference signal (SRS) that is transmitted from a UE to a BS, for use in measuring the state of a UL channel established between the UE and the BS. A reference signal (RS) is a predefined signal having a special waveform known to both a UE and a BS. The RS is also called a pilot signal.

A cell refers to a predetermined geographical area to which a BS, a node(s), or an antenna port(s) provides a communication service in the present invention. Thus, communication with a specific cell may mean communication with a BS, a node, or an antenna port that provides a communication service to the specific cell in the present invention. A DL or UL signal of the specific cell is a DL or UL signal from or to the BS, the node, or the antenna port that provides a communication service to the specific cell. A channel state or quality of the specific cell refers to the channel state or quality of a channel or communication link established between a UE and the BS, the node, or the antenna port that provides a communication service to the specific cell.

FIG. 1 illustrates exemplary radio frame structures in a wireless communication system. Specifically, FIG. 1(a) illustrates an exemplary radio frame structure used in frequency division duplex (FDD) in a 3GPP LTE(-A) system and FIG. 1(b) illustrates an exemplary radio frame structure used in time division duplex (TDD) in the 3GPP LTE(-A).

Referring to FIG. 1, a 3GPP LTE(-A) radio frame is 10 ms (307200 Ts) and divided into 10 equal-sized subframes. The 10 subframes of a radio frame may be indexed. Herein, $T_s$ represents a sampling time and Ts=1/(2048*15 kHz). Each subframe is 1 ms long, including two slots. The 20 slots of a radio frame may be indexed sequentially from 0 to 19. Each slot is 0.5 ms long. A unit time over which one subframe is transmitted is defined as a transmission time interval (TTI). Time resources may be identified by a radio frame number (or a radio frame index), a subframe number (or a subframe index), a slot number (or a slot index), etc.

Different radio frames may be configured for different duplexing modes. For example, downlink (DL) transmission and uplink (UL) transmission are distinguished by frequency in the FDD mode and thus a radio frame includes only DL subframes or UL subframes for a predetermined frequency band that operates at a predetermined carrier frequency. DL transmission and UL transmission are distinguished by time in the TDD mode and thus a TDD radio frame includes both UL subframes and DL subframes for a predetermined frequency band that operates at a predetermined carrier frequency.

Table 1 below shows an example of a DL-UL configuration in subframes in a wireless frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 below, D represents a DL subframe, U represents a UL subframe, and S represents a special subframe. Specifically, a subframe includes three fields of a downlink pilot timeslot (DwPTS), a guard period (GP), and uplink pilot timeslot (UpPTS). The DwPTS is a time period reserved for DL transmission and the UpPTS is a time period reserved for UL transmission.

Figure 2:
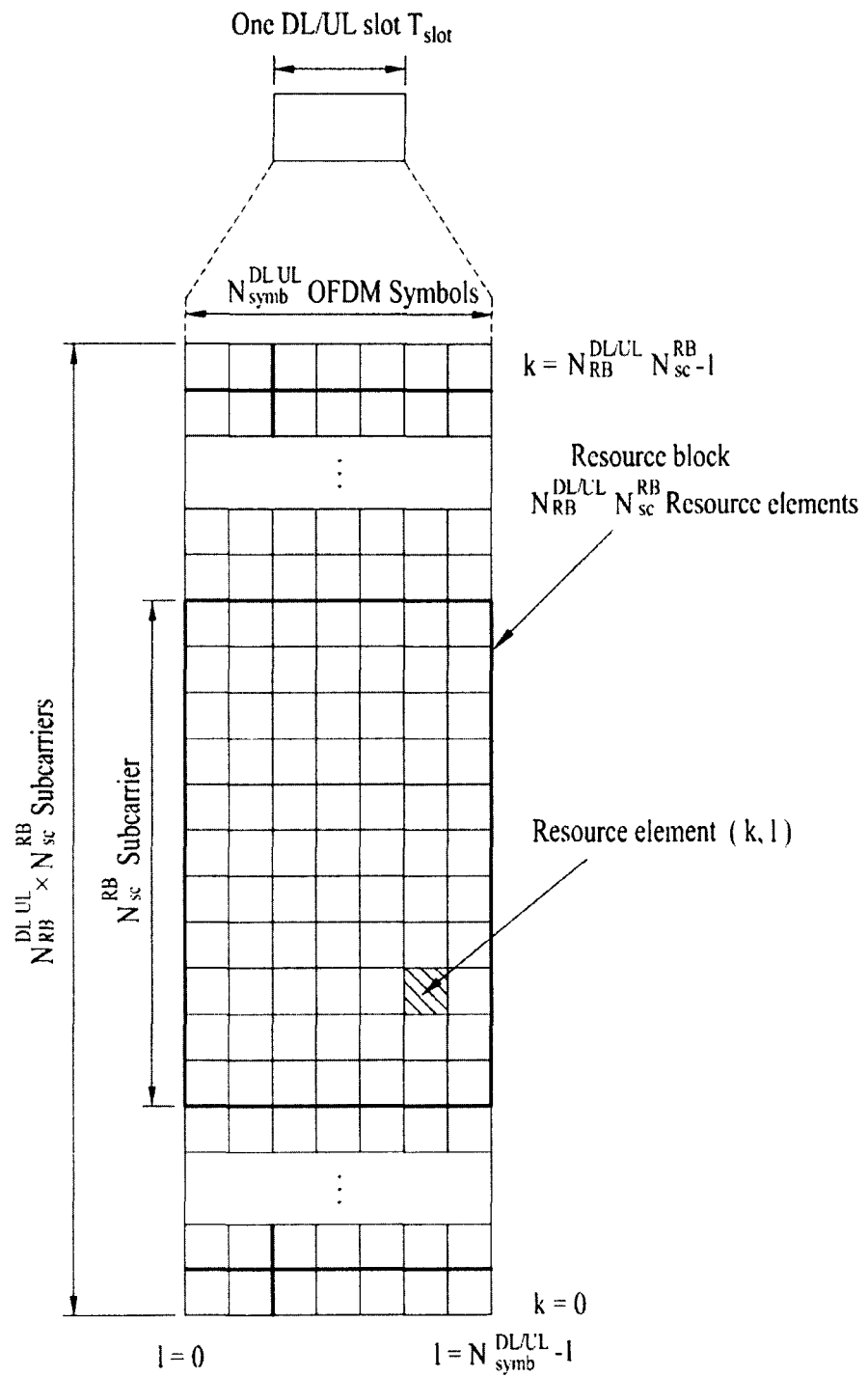
FIG. 2 illustrates an exemplary downlink (DL)/uplink (UL) slot structure in a radio communication system.

FIG. 2 illustrates an exemplary DL/UL slot structure in a radio communication system. Specifically, FIG. 2 illustrates a structure of a resource grid in a 3GPP LTE(-A) system. One resource grid is present per antenna port.

A slot includes a plurality of orthogonal frequency division multiplexing (OFDM) symbols in the time domain and a plurality of resource blocks (RBs) in the frequency time. An OFDM symbol may refer to one symbol period. Referring to FIG. 2, a signal transmitted in each slot may be expressed by a resource grid including $N_{RB}^{DL/UL} \times N_{sc}^{RB}$ subcarriers and $N_{symb}^{DL/UL}$ OFDM symbols. Here, $N_{RB}^{DL}$ refers to the number of RBs in a DL slot and $N_{RB}^{UL}$ refers to the number of RBs in a UL slot. $N_{RB}^{DL}$ and $N_{RB}^{UL}$ depend upon a DL transmission bandwidth and a UL transmission bandwidth, respectively. $N_{symb}^{DL}$ refers to the number of OFDM symbols in a DL slot and $N_{symb}^{UL}$ refers the number of OFDM symbols in a UL slot. $N_{sc}^{RB}$ refers to the number of subcarriers constituting one RB.

An OFDM symbol may be called an OFDM symbol, a SC-FDM symbol, etc. according to a multiple access scheme. The number of OFDM symbols included in one slot may vary depending on a channel bandwidth and a cyclic prefix (CP) length. For example, in the case of a normal CP, one slot includes 7 OFDM symbols. In the case of an extended CP, one slot includes 6 OFDM symbols. Although one slot of a subframe including seven OFDM symbols is shown in FIG. 2 for convenience of description, the embodiments of the present invention are similarly applicable to subframes having a different number of OFDM symbols. Referring to FIG. 2, each OFDM symbol includes $N_{RB}^{DL/UL} \times N_{sc}^{RB}$ subcarriers in the frequency domain. A subcarrier may be categorized into a data subcarrier for data transmission, a reference signal (RS) subcarrier for RS transmission, and a null subcarrier for a guard band and a direct current (DC) component. The null subcarrier for the DC component is unused and is mapped to a carrier frequency $f_0$ in a process of generating an OFDM signal or in a frequency up-conversion process. The carrier frequency is also called a center frequency.

One RB is defined as $N_{symb}^{DL/UL}$ (e.g., 7) consecutive OFDM symbols in the time domain and is defined as $N_{sc}^{RB}$ (e.g., 12) consecutive subcarriers in the frequency domain. For reference, a resource including one OFDM symbol and one subcarrier is called a resource element (RE) or a tone. Thus, one RB includes $N_{RB}^{DL/UL} \times N_{sc}^{RB}$ REs. Each RE in a resource grid is inherently defined by an index pair (k, l) in one slot. k is an index from $0$ to $N_{RB}^{DL/UL} \times N_{sc}^{RB} - 1$ in the frequency domain and l is an index from $0$ to $N_{symb}^{DL/UL} - 1$ in the time domain.

Two RBs that are respectively located in two slots of the subframe while occupying the same $N_{sc}^{RB}$ consecutive subcarriers in one subframe is called a physical resource block (PRB) pair. The two RBs constituting the PRB pair have the same PRB number (or the same PRB index). A VRB is a logical resource allocation unit for resource allocation. The VRB has the same size as a PRB. According to how a VRB is mapped to a PRB, the VRB is categorized into a localized VRB and a distributed VRB. Localized VRBs are mapped directly to PRBs such that VRB numbers (VRB indexes) correspond directly to PRB numbers. That is, $n_{PRB} = n_{VRB}$. The localized VRBs are sequentially indexed from $0$ to $N_{VRB}^{DL} - 1$ and $N_{VRB}^{DL} = N_{RB}^{DL}$. Thus, according to a localized mapping method, VRBs having the same VRB number are mapped to PRBs having the same PRB number in a first slot and a second slot. On the other hand, the distributed VRB is mapped to a PRB via interleaving. Thus, the distributed VRB having the same VRB number may be mapped to PRBs having different numbers in a first slot and a second slot. Two PRBs that are respectively located in two slots of a subframe and have the same VRB number are called a VRB pair.

Figure 3:
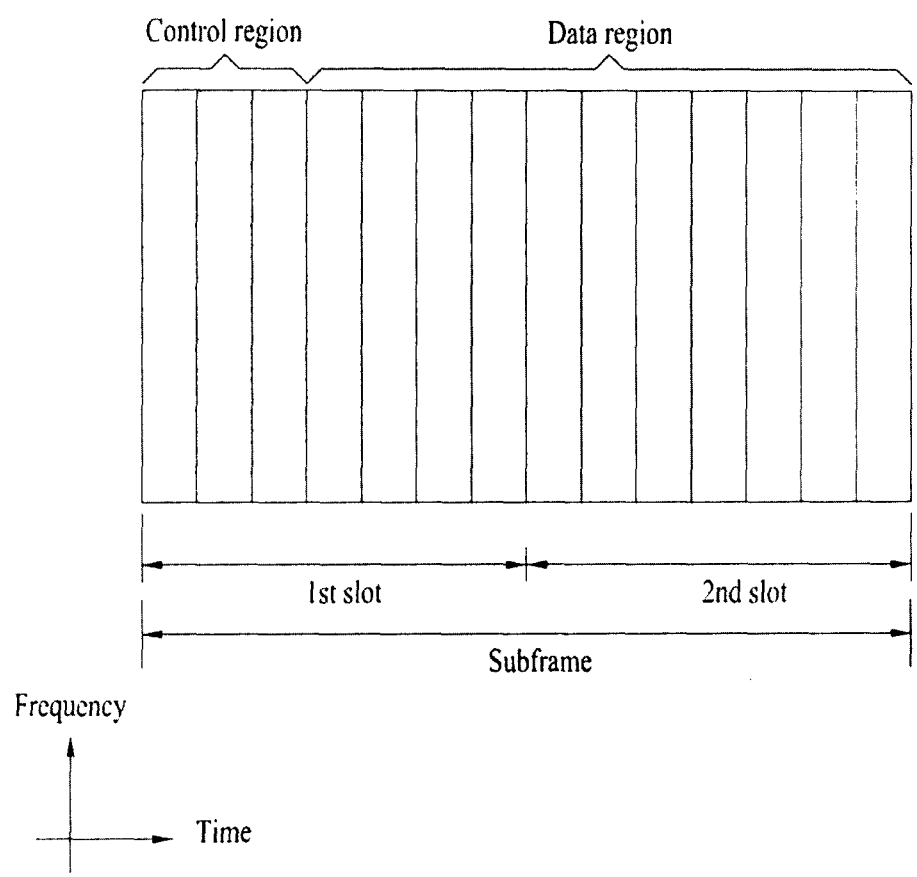
FIG. 3 illustrates a structure of a DL subframe in a $3^{rd}$ generation partnership project long term evolution-Advanced (3GPP LTE(-A)) system.

FIG. 3 illustrates a structure of a DL subframe in a 3GPP LTE(-A) system.

The DL subframe is divided into a control region and a data region in a time domain. Referring to FIG. 3, up to three (or four) OFDM symbols at the start of the first slot in a DL subframe are used for the control region to which control channels are allocated. Hereinafter, the resource region that can be used for PDCCH transmission in the DL subframe is referred to as a PDCCH region. The other OFDM symbols except for the OFDM symbol(s) used for the control region are used for a data region to which a PDSCH is allocated. Hereinafter, the resource region that can be used for PDSCH transmission in the DL subframe will be referred to as a PDSCH region. DL control channels used in the 3GPP LTE system include a physical control format indicator channel (PCFICH), a physical downlink control channel (PDCCH), a physical hybrid automatic repeat request (HARQ) indicator channel (PHICH), etc. The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to UL transmission.

Control information carried on the PDCCH is called downlink control information (DCI). The DCI includes resource allocation information for a UE or a UE group and other control information. For example, the DCI includes information about resource allocation and a transport format for a downlink shared channel (DL-SCH), information about resource allocation and a transport format for an uplink shared channel (UL-SCH), paging information of a paging channel (PCH), system information on the DL-SCH, information about resource allocation for a higher-layer control message such as a random access response transmitted on the PDSCH, a set of transmission (Tx) power control commands for individual UEs of a UE group, Tx power control information, voice over internet protocol (VoIP) activation information, etc. The DCI carried on one PDCCH may have different sizes and usages according to a DCI format and may have a different size according to coding rate.

A plurality of PDCCHs may be transmitted in the PDCCH region of the DL subframe. A UE may monitor a plurality of PDCCHs. A BS determines a DCI format according to a DCI transmitted to the UE and adds a cyclic redundancy check (CRC) to the DCI. The CRC is masked (or scrambled) by an identifier (ID) (e.g., a radio network temporary identifier (RNTI)) according to the owner or usage of the PDCCH. For example, if the PDCCH is directed to a specific UE, its CRC may be masked by an ID (e.g., a cell-RNTI (C-RNTI)) of the UE. If the PDCCH is for a paging message, the CRC of the PDCCH may be masked by a paging indicator identifier (P-RNTI). If the PDCCH is for a paging message, the CRC of the PDCCH may be masked by a paging ID (e.g., paging indicator identifier (P-RNTI)). If the PDCCH carriers system information (particularly, system information block (SIB)), its CRC may be masked by a system information RNTI (SI-RNTI). To indicate that the PDCCH carries a random access response in response to a random access preamble transmitted by a UE, its CRC may be masked by a random access-RNTI (RA-RNTI). CRC masking (or scrambling) may include, for example, XOR operation of CRC and RNTI at a bit level.

The PDCCH is transmitted on aggregation of one or more consecutive control channel element (CCEs). A CCE is a logical allocation unit used to provide a coding rate to the PDCCH based on a wireless channel state. The CCE corresponds to a plurality of resource element groups (REGs). For example, one CCE corresponds to 9 REGs and one REG corresponds to 4 REs. 4 QPSK symbols are mapped to each REG. An RE occupied by an RS is not included in an REG. Thus, the number of REGs in a given OFDM symbol may vary according to presence of an RS. The REG concept may also be used for other DL control channels (i.e., a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located around a cell edge), 8 CCEs may be required to obtain sufficient robustness.

Figure 4:
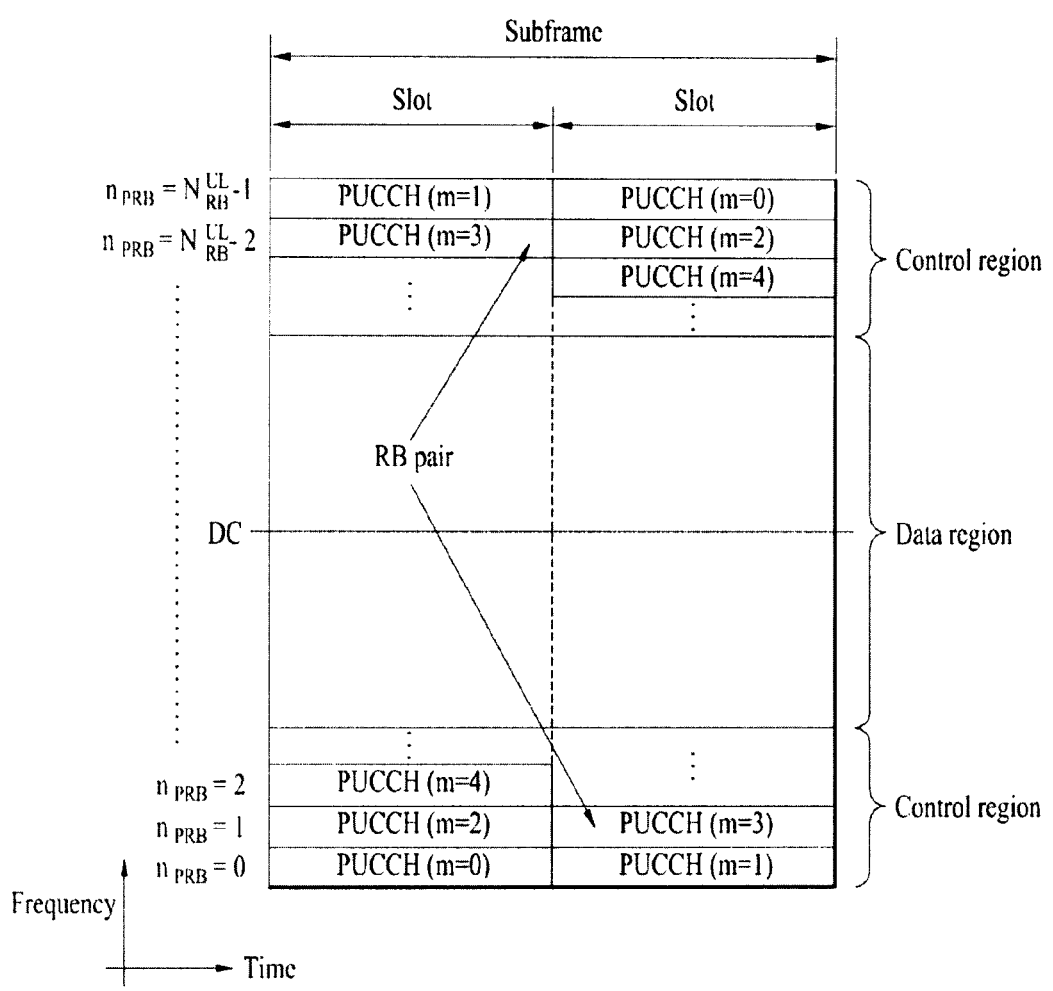
FIG. 4 illustrates the structure of a UL subframe in a 3GPP LTE(-A) system.

FIG. 4 illustrates the structure of a UL subframe in a 3 GPP LTE(-A) system.

Referring to FIG. 4, the UL subframe may be divided into a control region and a data region in the frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency $f_0$ in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH format 1 series and PUCCH format 3 series are used to transmit ACK/NACK information and PUCCH format 2 series is mainly used to carry channel state information such as channel quality indicator (CQI)/precoding matrix index (PMI)/rank index (RI).

Figure 5:
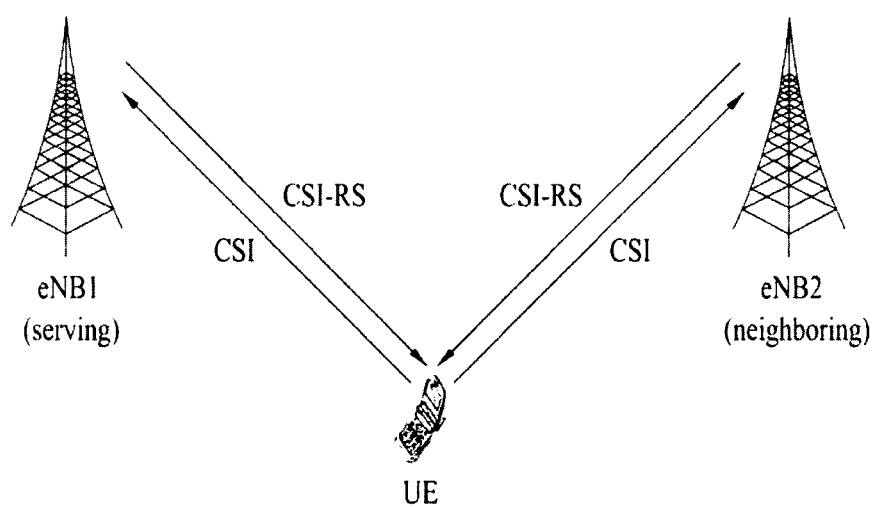
FIG. 5 is a schematic diagram of an exemplary wireless communication system using a coordinated multi-point transmission and reception (CoMP) scheme.

FIG. 5 is a schematic diagram of an exemplary wireless communication system using a coordinated multi-point transmission and reception (CoMP) scheme. More BSs as well as two illustrated BSs eNB1 and eNB2 may participate in the CoMP scheme and a CoMP set including a plurality of BSs is referred to as a CoMP set. Here, each BS may include a plurality of antenna ports.

Referring to FIG. 5, a plurality of BSs may be arranged around a UE that is connected to a first BS eNB1 and a second BS eNB2, in detail, to a plurality of antenna ports of the first BS eNB1 and the second BS eNB2. The UE may report channel state information about the plural antenna ports to a network. That is, the UE may transmit the channel state information about the plural antenna ports to a BS that the UE accesses. The network performs scheduling on the UE based on the channel state information.

According to the present invention, the channel state information collectively refers to information indicating the quality of a wireless channel (or a link) formed between a UE and an antenna port. For example, the channel state information corresponds to a channel quality indicator (CQI), a rank index (RI), a precoding matrix index (PMI), etc.

Various RSs are transmitted between a BS and a UE for alleviation of interfered signals, estimation of a channel state between the BS and the UE, demodulation of a signal transmitted between the BS and the UE, etc. An RS is transmitted to the UE from the BS or to the BS from the UE, refers to a predefined signal known to a UE and a BS and having a special waveform, and is referred to as a pilot signal. 3GPP LTE release 8 (hereinafter, Rel-8) proposes a cell specific reference signal (CRS) for channel measurement for CQI feedback and channel estimation of a physical downlink shared channel (PDSCH). However, 3GPP LTE release 10 (hereinafter, Rel-10) proposes a channel state information reference signal (CSI-RS) for channel estimation of a PDSCH for a UE designed in conformance with Rel-10 separately from the CRS of the Rel-8.

Each BS may transmit a CSI-RS for channel measurement to a UE through a plurality of antenna ports. Each UE may calculate channel station information based on the CSI-RS and transmit the channel station information to the BS in response to the CSI-RS.

In the case of wireless communication using the CoMP set, a UE receives a CSI-RS transmitted from a plurality of BSs or antenna ports. The UE may estimate and feedback CSI of the CoMP set using all the CSI-RSs. In addition, the UE may estimate and feedback unique CSIs of some BSs or antenna ports using CSI-RSs from the some BSs or antenna ports, receive the CSIs from a network, and combines the CSIs. In this case, a phase difference between the unique CSIs may occur due to reasons such as physical separation between CSI-RS transmission points, etc. When CSI of a CoMP set formed by combining the unique CSIs with a phase difference is used, signals received by a UE from a plurality of BSs or antenna ports may cause mutual interference. Hereinafter, this interference will be described briefly with reference to FIG. 6.

Figure 6:
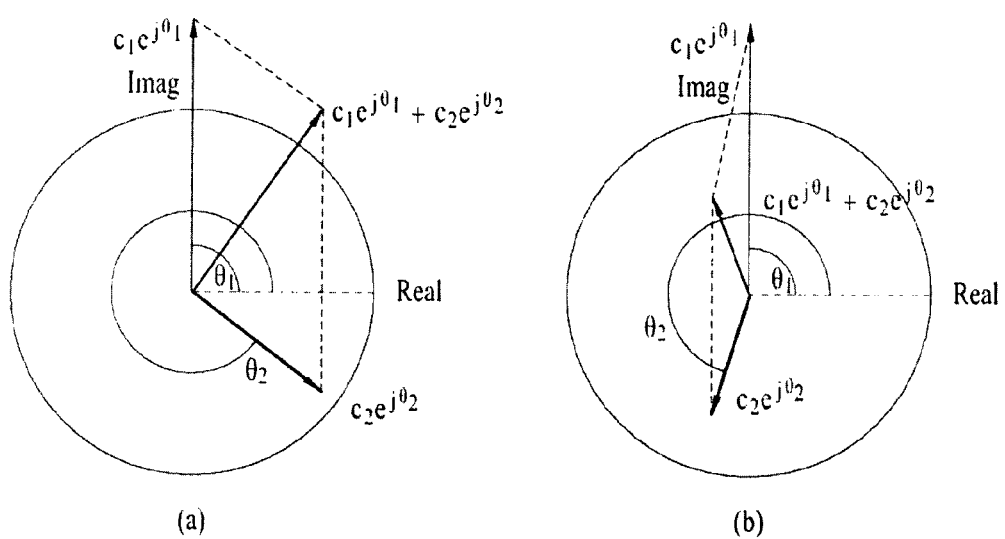
FIG. 6 illustrates an example of interference when a coordinated multiple point transmission and reception (CoMP) set transmits data to one user equipment (UE)

FIG. 6 illustrates an example of interference when a CoMP set transmits data to one UE. The CoMP set including a plurality of BSs may simultaneously transmit data to one UE in DL of a wireless communication system. In this case, a signal received by the UE may be represented as a sum of signals received from each BS of the CoMP set. In this case, when precoding matrix indicator (PMI) information about each BS is independently determined, a phase difference between the signals received from the BSs occurs, thereby reducing gain of the CoMP scheme due to destructive interference between signals. Assuming that the CoMP set including the first BS eNB and the second BS eNB2 transmits one data stream, a signal received by the UE may be represented according to Equation 1 below.

$$y = u^H(H_1 v_1 + H_2 v_2)d = (c_1 e^{j\theta_1} + c_2 e^{j\theta_2})d \quad \text{[Equation 1]}$$

In Equation 1 above, v1 and v2 are transmission beam vectors corresponding to PMI1 and PMI2, respectively, u is a reception combining vector, d is data, $H_1$ and $H_2$ are channels between the UE and the first BS eNB1 and second BS eNB2, respectively, and $c_1 e^{j\theta_1}$ and $c_2 e^{j\theta_2}$ are complex number indicating valid channels corresponding to the first BS eNB1 and the second BS eNB2, respectively. In this case, as illustrated in FIG. 6(a) or 6(b), destructive interference may occur between received signals due to a difference between $\theta_1$ and $\theta_2$. Destructive interference occurs because compensation between CSIs corresponding to BSs is not performed when CSI feedback is transmitted without considering an entire CoMP set.

Accordingly, the present invention proposes a method of transmitting CSI feedback corresponding to a CoMP set by compensating estimated CSIs from respective BSs. According to detailed embodiments of the present invention, cases in which CSI-RS configurations per BS are the same or different while PMI and CQI corresponding to a CoMP set are derived. In addition, all possible sets according to the types of PMI and CQI during configuration of CSI obtained by integration of the PMI and the CQI are considered.

The proposed method may support a general CoMP scheme such as coordinated scheduling (CS), coordinated beamforming (CB), etc. and may also select a single PMI of a CoMP set using a joint transmission (JP) scheme to effectively transmit CSI feedback without additional overhead such as phase difference information. Hereinafter, an operating principle of the CoMP set using the JT scheme will be described with regard to an embodiment of the present invention.

CSI-RS transmission may not collide between adjacent cells and CSI-RS locations of the adjacent cells may not overlap. Thus, time-frequency resources to which CSI-RSs of the adjacent cells are allocated may be orthogonal to each other. The orthogonality of the CSI-RS may be obtained by mapping CSI-RSs transmitted by the adjacent cells to radio resources so as not to overlap each other in predetermined time/frequency resource regions (e.g., an RB pair). Hereinafter, an antenna port for transmitting a CSI-RS is called a CSI-RS port and a location of a resource in a predetermined resource region for transmitting corresponding CSI-RS(s) by the CSI-RS port(s) is called CSI-RS pattern or CSI-RS configuration. In addition, a time-frequency resource to which a CSI-RS is allocated/transmitted is called a CSI-RS resource. For example, a resource element (RE) used for CSI-RS transmission is called a CSI-RS RE. Unlike a CRS with a fixed position of an RE for CRS transmission per antenna port, the CSI-RS has a maximum of 32 different configurations in order to reduce inter-cell interference (ICI) in a multi-cell environment including a heterogeneous network environment. The CSI-RS may be differently configured according to the number of antenna ports in a cell and may be configured such that adjacent cells have different configurations if possible. The CSI-RS supports a maximum of 8 antenna ports (p=15, p=15 and 16, p=15 to 18, and p=15 to 22) and is defined only for Δf=15 kHz. Hereinafter, the antenna ports p=15 to 22 may correspond to CSI-RS ports p=0 to 7, respectively.

Tables 3 and 4 below shows exemplary CSI-RS configurations used in a frequency division duplex (FDD) frame structure (hereinafter, FS-1) and a time division duplex (TDD) frame structure (hereinafter, FS-2). Specifically, Table 3 shows CSI-RS configurations in a subframe having a normal CP and Table 4 shows CSI-RS configurations in a subframe in an extended CP.

TABLE 3

| | CSI ref- | Number of CSI reference signals configured | | | | | |
|---|---|---|---|---|---|---|---|
| | erence | 1 or 2 | | 4 | | 8 | |
| | signal configu- ration | (k', l') | $n_s$ mod 2 | (k', l') | $n_s$ mod 2 | (k', l') | $n_s$ mod 2 |
| Frame struc- ture type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame struc- ture type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 4

| | CSI ref- | Number of CSI reference signals configured | | | | | |
|---|---|---|---|---|---|---|---|
| | erence | 1 or 2 | | 4 | | 8 | |
| | signal configu- ration | (k', l') | $n_s$ mod 2 | (k', l') | $n_s$ mod 2 | (k', l') | $n_s$ mod 2 |
| Frame struc- ture type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |

TABLE 4-continued

| CSI ref-erence signal configu-ration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 13 | (6, 4) | 1 | | | | |
| 14 | (1, 4) | 1 | | | | |
| 15 | (0, 4) | 1 | | | | |
| Frame 16 | (11, 1) | 1 | (11, 1) | 1 | (11, 1) | 1 |
| struc- 17 | (10, 1) | 1 | (10, 1) | 1 | (10, 1) | 1 |
| ture 18 | (9, 1) | 1 | (9, 1) | 1 | (9, 1) | 1 |
| type 2 19 | (5, 1) | 1 | (5, 1) | 1 | | |
| only 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

When (k',l') (here, k' is a subcarrier index in a resource block and l' is an OFDM symbol index in a slot) and $n_s$ (here, $n_s$ is a slot index in a frame) of Table 3 or 4 are applied to the following equation, a time-frequency resource used for corresponding CSI-RS transmission by each CSI-RS port may be determined. That is, in a slot $n_s$ in a subframe (hereinafter, a CSI-RS subframe) configured for CSI-RS transmission, a CSI-RS sequence may be mapped to complex-valued modulation symbols $a^{(p)}_{k,l}$ used as reference symbols on a CSI-RS port p according to the following equation.

$$a_{k,l}^{(p)} = w_{l''} \cdot r_{l,n_s}(m') \quad \text{[Equation 2]}$$

In [Equation 3] below, a resource index pair (k,l) (here, k is a subcarrier index and l is an OFDM symbol index in a subframe) used for CSI-RS transmission by a CSI-RS port p may be determined according to the following equation.

$$k = k' + 12m + \begin{cases} -0 & \text{for } p \in \{0, 1\}, \text{ normal cyclic prefix} \\ -6 & \text{for } p \in \{2, 3\}, \text{ normal cyclic prefix} \\ -1 & \text{for } p \in \{4, 5\}, \text{ normal cyclic prefix} \\ -7 & \text{for } p \in \{6, 7\}, \text{ normal cyclic prefix} \\ -0 & \text{for } p \in \{0, 1\}, \text{ extended cyclic prefix} \\ -3 & \text{for } p \in \{2, 3\}, \text{ extended cyclic prefix} \\ -6 & \text{for } p \in \{4, 5\}, \text{ extended cyclic prefix} \\ -9 & \text{for } p \in \{6, 7\}, \text{ extended cyclic prefix} \end{cases} \quad \text{[Equation 3]}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{0, 1, 2, 3\} \\ (-1)^{l''} & p \in \{4, 5, 6, 7\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Figure 7:
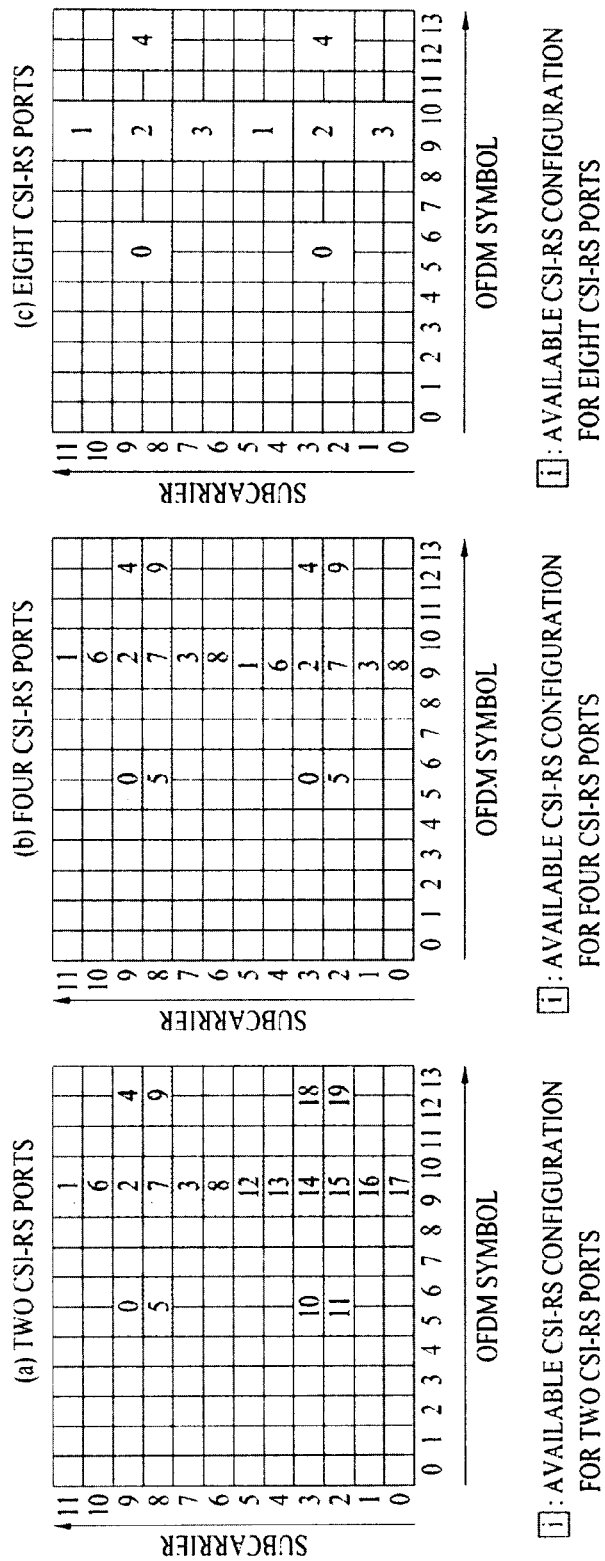
FIG. 7 illustrates exemplary channel state information reference signal (CSI-RS) configurations.

FIG. 7 illustrates exemplary CSI-RS configurations. Specifically, FIG. 7 illustrates CSI-RS configurations according to Equation 2 above and Table 3 above and illustrates positions of resources occupied by a CSI-RS in one RB pair according to a CSI-RS configuration.

Referring to FIG. 7, FIG. 7(a) illustrates 20 available CSI-RS configurations for CSI-RS transmission by 2 CSI-RS ports, FIG. 7(b) illustrates 10 available CSI-RS configurations by 4 CSI-RS ports, and FIG. 7(c) illustrates 5 available CSI-RS configurations by 8 CSI-RS ports. The CSI-RS configurations defined according to the number of CSI-RS ports may be indexed.

When a BS includes two antenna ports for CSI-RS transmission, that is, when 2 CSI-RS ports are configured, the 2 CSI-RS ports transmit a CSI-RS on a radio resource corresponding to one of the 20 CSI-RS configurations illustrated in FIG. 7(a). When the number of CSI-RS ports configured for a specific cell is 4, the 4 CSI-RS ports transmit a CSI-RS on resources of a CSI-RS configuration for a specific cell among the 10 CSI-RS configurations illustrated in FIG. 7(b). Similarly, when the number of CSI-RS ports configured for the specific cell is 8, the 8 CSI-RS ports transmit a CSI-RS on resources of a CSI-RS configuration among the 5 CSI-RS configurations illustrated in FIG. 7(c).

The CSI-RS configurations of Tables 3 and 4 have nested properties. The nested properties refer to property in which a CSI-RS configuration for a higher number of CSI-RS ports is a superset of a CSI-RS configuration for a small number of CSI-RS ports. For example, referring to FIGS. 7(b) and 7(c), REs constituting CSI-RS configuration 0 for 4 CSI-RS ports are included in resources constituting CSI-RS configuration 0 for 8 CSI-RS ports.

A plurality of CSI-RSs may be used in a given cell. In the case of a non-zero power CSI-RS, only a CSI-RS for one configuration is transmitted. In the case of a zero power CSI-RS, a CSI-RS for a plurality of configurations may be transmitted. A UE assumes zero transmission power for resources except for resources assumed for the non-zero power CSI-RS among resources corresponding to the zero power CSI-RS. For example, with regard to a radio frame for TDD, a CSI-RS is not transmitted on a special subframe in which DL transmission and UL transmission coexist, a subframe for transmitting a paging message, a synchronization signal, and a subframe in which a CSI-RS collides with transmission of a physical broadcast channel (PBCH) or a system information block type1 (SIB1), and a UE assumes that a CSI-RS is not transmitted on these subframes. Time-frequency resources used to transmit a corresponding CSI-RS by a CSI-RS port are not used for PDSCH transmission on any antenna port and are not used for CSI-RS transmission of another antenna port that is not the corresponding CSI-RS port.

Time-frequency resources used for CSI-RS transmission cannot be used for data transmission. Thus, as CSI-RS overhead is increased, data throughput is reduced. In consideration of this, a CSI-RS is configured to be transmitted at a predetermined transmission frequency corresponding to a plurality of subframes rather than being transmitted every subframe. In this case, it is advantageous to reduce CSI-RS transmission overhead compared with the case in which a CSI-RS is transmitted every subframe. Hereinafter, a subframe configured for CSI-RS transmission is referred to as a CSI-RS subframe. The CSI-RS subframe may be defined by a CSI-RS periodicity and a subframe offset. The CSI-RS periodicity and the subframe offset are collectively referred to as a CSI-RS subframe configuration. Table 5 below shows exemplary CSI-RS periodicity $T_{CSI-RS}$ and subframe offset $\Delta_{CSI-RS}$.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| $I_{CSI-RS} \leq 4$ | 5 | $I_{CSI-RS}$ |
| $5 \leq I_{CSI-RS} \leq 14$ | 10 | $I_{CSI-RS} - 5$ |
| $15 \leq I_{CSI-RS} \leq 34$ | 20 | $I_{CSI-RS} - 15$ |
| $35 \leq I_{CSI-RS} \leq 74$ | 40 | $I_{CSI-RS} - 35$ |
| $75 \leq I_{CSI-RS} \leq 154$ | 80 | $I_{CSI-RS} - 75$ |

In Table 5 above, $I_{CSI-RS}$ specifies CSI-RS periodicity and subframe offset.

A BS may determine or adjust $I_{CSI-RS}$ and transmit $I_{CSI-RS}$ to UEs within coverage of a corresponding cell. A UE may know a CSI-RS subframe for transmitting a CSI-RS of a cell (hereinafter, a serving cell) providing a communication service to the UE based on $I_{CSI-RS}$. The UE may determine a subframe satisfying the following equation as the CSI-RS subframe.

$$(10n_f + \lfloor n_s/2 \rfloor - \Delta_{CSI-RS}) \bmod T_{CSI-RS} = 0 \quad \text{[Equation 4]}$$

Here, $n_f$ denotes a system frame number and $n_s$ denotes a slot number in a radio frame.

For example, as shown in Table 3, when $I_{CSI-RS}$ is equal to or more than 5 and equal to or less than 14, a CSI-RS is transmitted every 10 subframes from a subframe with a subframe #($I_{CSI-RS}$−5) in a radio frame.

The BS may notify the UE of the following parameters via higher layer signaling (e.g., medium access control (MAC) signaling and radio resource control (RRC) signaling).

The number of CSI-RS ports
CSI-RS configuration (e.g., refer to Tables 1 and 2)
CSI-RS subframe configuration (e.g., refer to Table 3)
CSI-RS subframe periodicity $T_{CSI-RS}$
CSI-RS subframe offset $\Delta_{CSI-RS}$ As necessary, the BS may notify the UE of a CSI-RS configuration transmitted at zero power and a subframe configuration for transmitting the zero power CSI-RS configuration. As the zero power CSI-RS configuration, the CSI-RS configurations of Tables 3 and 4 may be used. As the subframe configuration for transmitting the zero power CSI-RS configuration, the CSI-RS subframe configuration of Table 5 may be used.

So far, communication standards have not defined a method of estimating channel states of BSs in a CoMP system. Thus, a method for more accurately measuring channel state information of BSs or antenna port(s) constituting a CoMP system will be described below.

Figure 8:
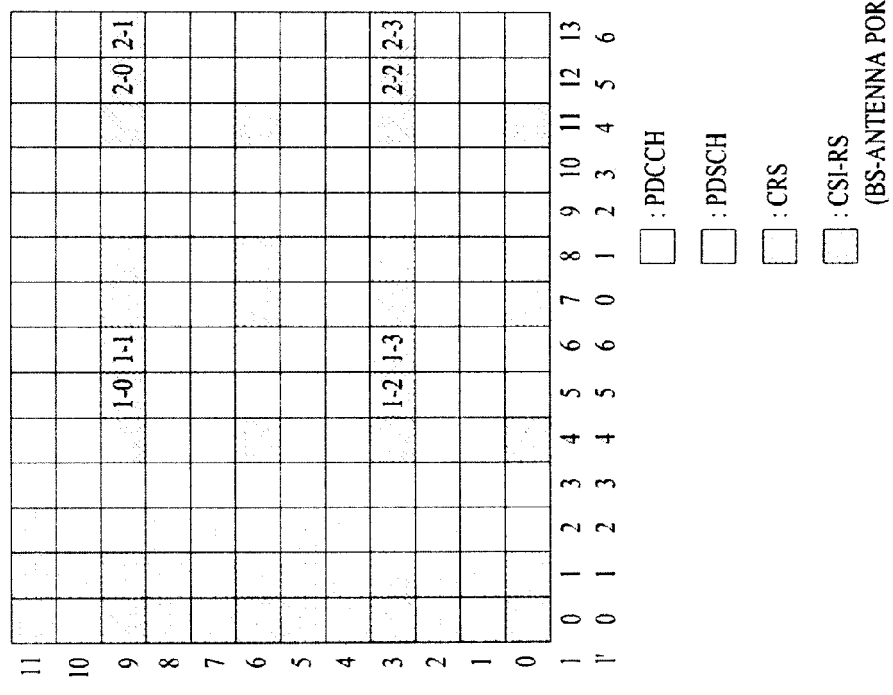
FIG. 8 illustrates an exemplary CSI-RS configuration of a CoMP wireless communication system according to an embodiment of the present invention.
Figure 8:
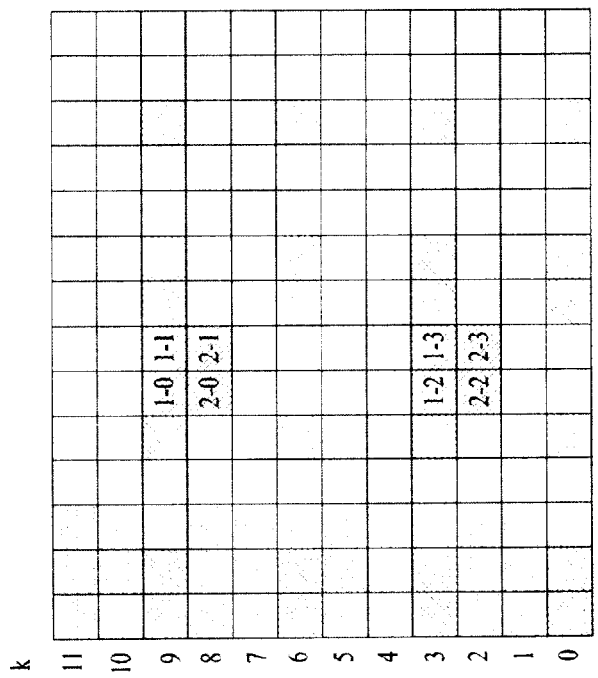

FIG. 8 illustrates an exemplary CSI-RS configuration for estimation of channel state information per BS in a CoMP system including two BSs. FIG. 8(a) illustrates a case in which a single CSI-RS configuration is applied to the two BSs belonging to a CoMP set and FIG. 8(b) illustrates a case in which different CSI-RS configurations are applied to the two BSs belonging to the CoMP set.

A UE needs to acquire a channel of the CoMP set from a CSI-RS (or a CRS) transmitted from each BS included in the CoMP set. In this case, the UE may independently estimate a channel of each BS using orthogonality of RS resources between BSs.

For example, as illustrated in FIG. 8(a), a single CSI-RS configuration may be applied to a CoMP set including a first BS and a second BS each having 4 antenna ports. In FIG. 8(a), among CSI-RS configurations for 8 CSI-RS ports, CSI-RS configuration 0 is applied (refer to FIG. 7(c)). x-y indicated in each RE is determined for an antenna port y of a BS x. As seen from FIG. 8(a), a single CSI-RS configuration is applied to antenna ports 0 to 3 of the first BS and antenna ports 0 to 3 of the second BS.

The 8 antenna ports may be divided into independent sets $P_1$ and $P_2$ each having 4 antenna ports. As illustrated in FIG. 8(a), the first BS and the second BS may transmit CSI-RSs about the four antenna ports through the CSI-RS configurations $P_1$ and $P_2$ that are distinguishable on resources such that the UE can estimate a channel. Thus, when the same CSI-RS configuration in the CoMP is applied, it is advantageous to maintain CSI-RS overhead to a constant value irrespective of the number of BSs that participate in CoMP.

As another example, as illustrated in FIG. 8(b), different CSI-RS configurations may be applied to a CoMP set including the first BS and the second BS each having 4 antenna ports. In FIG. 8(b), among CSI configurations for 4 CSI-RS ports, CSI-RS configurations 0 and 4 are applied (refer to FIG. 7(b)). As seen from FIG. 8(b), different CSI-RS configurations are applied to antenna ports 0 to 3 of the first BS and antenna ports 0 to 3 of the second BS.

The 8 antenna ports may be divided into independent sets $P_1$ and $P_2$ each having 4 antenna ports. As illustrated in FIG. 8(b), the first BS and the second BS may transmit CSI-RSs of the four antenna ports through the CSI-RS configurations $P_1$ and $P_2$ that are distinguishable on resources such that the UE can estimate a channel. Thus, when different CSI-RS configurations in the CoMP set are applied, it is advantageous to easily achieve extension with respect to a CoMP set including a random number of BSs.

When a single CSI-RS configuration is applied to a plurality of antenna ports belonging to a CoMP system, the single CSI-RS configuration needs to support a greater number of antenna ports than the total number of antenna ports allocated to BSs in the CoMP set. In addition, the number of supportable antenna ports by the CSI-RS configuration may not be equal to the number of antenna ports that are used in communication using a CoMP system in reality.

FIG. 9(a) illustrates a CSI-RS resource pattern for one BS including 4 antenna ports using a single CSI-RS configuration and FIG. 9(b) illustrates a CSI-RS resource pattern for 3 BSs each including one antenna port using a single CSI-RS configuration. As seen from FIG. 9(a), the number of cases of the single CSI-RS configuration (4-port CSI-RS) for CSI-RS resource allocation is equal to the total number (e.g., 4) of antenna ports allocated to BSs. As seen from FIG. 9(b), the number of cases of the single CSI-RS configuration (4-port CSI-RS) for SI-RS resource allocation is greater than the total number (e.g., 3) of antenna ports allocated to BSs.

Figure 9:
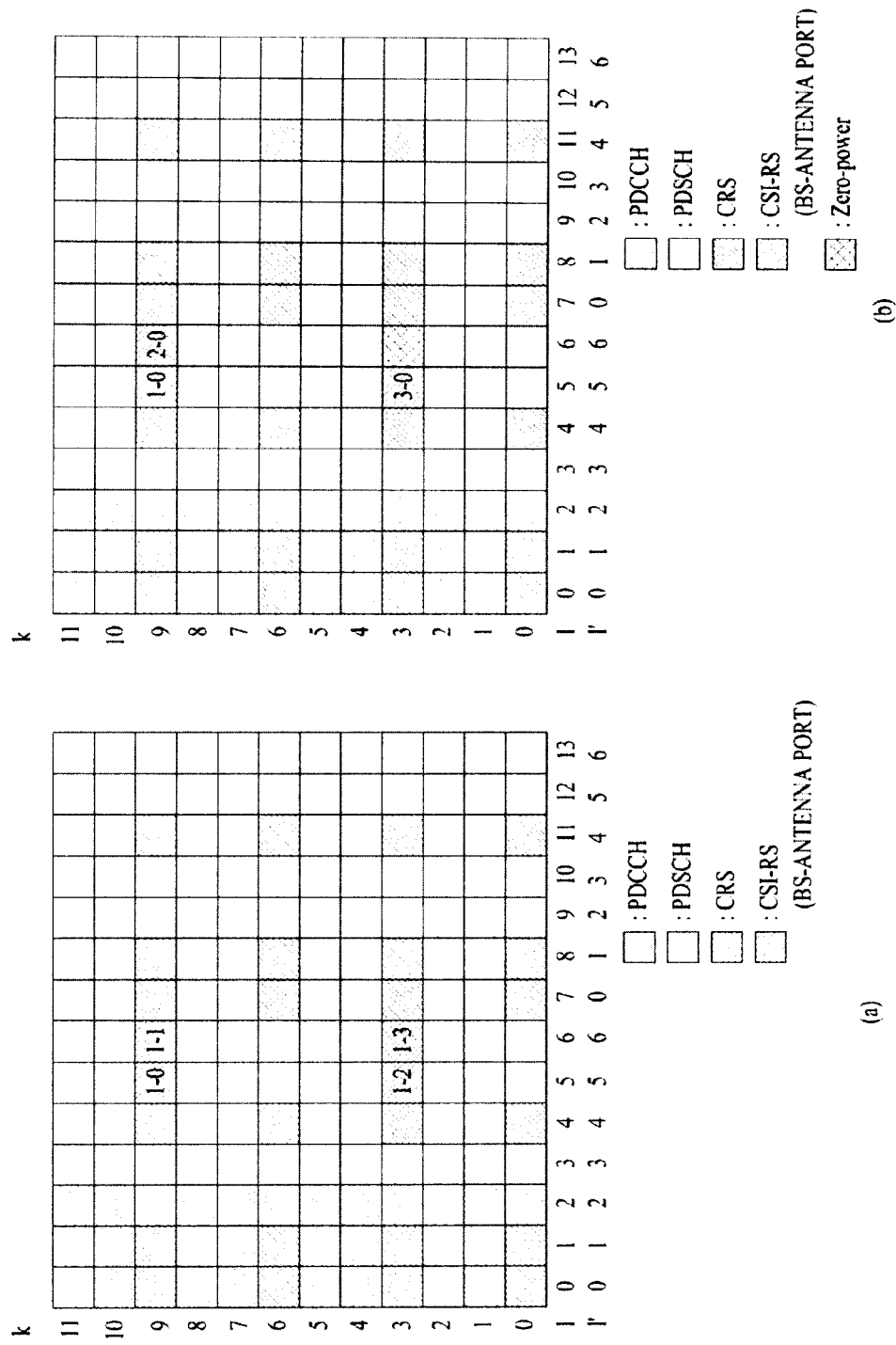
FIG. 9 illustrates an exemplary CSI-RS configuration of a CoMP wireless communication system according to an embodiment of the present invention.

Specifically, as seen from FIG. 9(B), although the single CSI-RS configuration is applied to support 4 of total antenna ports, each of the first BS, the second BS, and the third BS supports one antenna port and thus a CSI-RS resource for the remaining one antenna port of the single CSI-RS configuration is not used for CSI-RS transmission. In other words, a resource that is not used for CSI-RS transmission may be allocated by power 0 and may be used for data transmission. For convenience of description, on the assumption that zero transmission power, i.e., power 0 is allocated, REs in the single CSI-RS configuration may include a CSI-RS RE to which transmission power 0 is allocated. In this case, a BS may transmit information about an antenna port, transmitted at zero power (or at the same transmission power as PDSCH transmission power) to a UE that accesses the BS. That is, the BS may notify the UE of whether an antenna port transmits a CSI-RS using the corresponding CSI-RS configuration or transmits data using the corresponding CSI-RS configuration. This operation performed on the UE by the BS may be applied to both cases in which one BS serves one UE and a plurality of BSs serves one UE. As illustrated in FIG. 9(*a*), when 4-port CSI-RS is applied, if one port (e.g., #3) among the four antenna ports of one BS of a CoMP set is not used for CSI-RS transmission, the BS may notify the UE that the antenna port #3 is not used for CSI-RS transmission. In addition, referring to FIG. 9(*b*), at least one BS (e.g., a BS of a serving cell) of the BSs may notify the UE that one port of 4-port CSI-RS configurations, that is, a right RE of REs configured for antenna ports of the third BS is transmitted at zero power. Information about the zero power transmission port may be transmitted to the UE via a higher layer signal. The zero power transmission port for a CSI-RS may be used for data transmission or interference measurement.

Hereinafter, a method of determining an optimal precoding matrix (PM) and PMI for a CoMP set using channel information estimated by the UE will be described with regard to an embodiment of the present invention.

When a single CSI-RS configuration is used in a process of estimating CSI per BS, the UE may assumes a CoMP set as a single cell and calculate an optimal PM using all channel information of the BSs. For example, when the single CSI-RS configuration is applied to the CoMP set including the first BS and the second BS each having 4 antenna ports, the UE may recognize that the UE receives a CSI-RS (or a CRS) from one BS having 8 of antenna ports in total and calculate a PM of one BS having the corresponding 8 antenna ports.

For example, it is assumed that one data stream is transmitted from the CoMP set including the first BS and the second BS. When channels of the BSs are $H_1$ and $H_2$, the UE may define a single channel $H=[H_1 H_2]$ of the CoMP set. The UE may estimate the channels as $\tilde{H}_1$ and $\tilde{H}_2$ through a received RS to acquire $\tilde{H}=[\tilde{H}_1 \tilde{H}_2]$. In this case, a beam vector for the CoMP set may be derived as an eigenvector corresponding to a maximum eigenvalue of $\tilde{H}^H\tilde{H}$. As another example, in order to serve data using a principal eigenvector of each of $H_1$ and $H_2$, the UE derives $\tilde{v}_1$ and $\tilde{v}_2$ as beam vectors using the eigenvalue corresponding to the maximum eigenvalue of $\tilde{H}_1^H\tilde{H}_1$ and $\tilde{H}_2^H\tilde{H}_2$. Then, in order to compensate for a phase difference of received signals of BSs, an optimal phase difference compensation value is selected according to the following equation.

$$\alpha_{max} = \operatorname*{argmax}_{0 \le \alpha \le 2\pi} \left\| u^H \left( \tilde{H}_1 \tilde{v}_1 + e^{j\alpha} \tilde{H}_2 \tilde{v}_2 \right) \right\| \quad \text{[Equation 5]}$$

In this case, the beam vector for the CoMP set may be derived according to $v=[\tilde{v}_1 \; e^{j\alpha_{max}}\tilde{v}_2]^T$. Then, the UE searches a codebook for a most approximate PMI for the determined optimal PM. In this case, the codebook refers to a codebook that can be used when the CoMP set is a single cell. For example, with regard to a CoMP set including the first BS and the second BS each having 4, the UE assumes the CoMP set as a single BS and determines a PMI using a codebook for 8 antenna ports.

On the other hand, when different CSI-RS configurations are applied to each BS in the CoMP set, the UE may calculate PMs of BSs and compensation values between the PMs using the CSI-RS configuration of each BS. For example, it is assumed that one data stream is transmitted from the CoMP set including the first BS and the second BS. When channels of the BSs are $H_1$ and $H_2$, the UE may estimate the channels as $\tilde{H}_1$ and $\tilde{H}_2$ using CSI-RSs of the first BS and the second BS. In this case, candidate groups of transmission beam vectors corresponding to PMI I for $H_1$ and PMI j for $H_2$ may be represented by $\{v1,i\}$ and $\{v2,j\}$ and a candidate group of phase difference compensation values may be presented by $\{\alpha k\}$. Thus, PMIs for the first BS and the second BS and the phase difference compensation value may be calculated according to the following equation.

$$(i_{max}, j_{max}, k_{max}) = \operatorname*{argmax}_{i,j,k} \left\| u^H \left( \tilde{H}_1 v_{1,i} + e^{j\alpha_k} \tilde{H}_2 v_{2,j} \right) \right\| \quad \text{[Equation 6]}$$

Accordingly, in this case, when an index $k_{max}$ for the phase difference compensation value is transmitted to a CoMP set through an additional resource, the second BS may apply $e^{j\alpha k_{max}} v_{2,j_{max}}$ to which a phase difference compensation value $e^{j\alpha k_{max}}$ is reflected to increase performance during DL transmission.

Hereinafter, a process for calculating CQI of the CoMP set will be described with regard to an embodiment of the present invention.

When a single CSI-RS configuration is applied to a CoMP set, a CQI for each BS is derived from some antenna ports of a CSI-RS referred to for determination of a PMI. That is, the UE may determine one PMI from one CSI-RS configuration and calculate a first CQI on the assumption that precoding corresponding to the determined PMI is applied to some antenna ports and transmitted. In this case, other antenna ports may assume cooperative silencing and assume that no signal is transmitted or may assume coordinated beamforming (CB) and assume that a signal is transmitted to a null space of precoding of the determined PMI, corresponding to the antenna ports. This operation may be applied to some other antennas of the corresponding CSI-RS configuration to calculate second and third CQIs, etc.

In the case of FIG. 8(*a*), as described above, the UE may assume 8 CSI-RS ports to determine a PMI, calculate a first CQI for antenna ports 0, 1, 2, and 3 to consider the first CQI as a CQI of the first BS, and calculate a second CQI for antenna ports 4, 5, 6, and 7 to consider the second CQI as a CQI of the second BS. For this operation, the BS may transmit a signal indicating antenna port(s) for calculation of each CQI to the UE through a higher layer signal.

When different CSI-RS configurations are applied to the CoMP set, the UE may calculate the first CQI, the second CQI, etc. through the respective CSI-RSs. Referring to FIG. 8(*b*), the UE may determine a PMI for the first BS from a 4-port CSI-RS located in a first slot (l=0 to 6) to calculate the first CQI and calculate the second CQI for the second BS from a 4-port CSI-RS of a second slot (l=7 to 13).

In some embodiments, a single CQI may be calculated and transmitted. For example, in the case of a TDD system, when additional information about noise power is present in channel information using an SRS, a CQI may be calculated.

Thus, only a single CQI about noise may be transmitted to support a CoMP operation. This structure may also be used in a method of transmitting a single CQI considering a JT scheme when a specific CoMP scheme such as JT is used.

Specifically, this structure may be usefully used in a TDD system that can effectively use symmetry of UL and DL. The UE may transmit an SRS for estimation of a UL channel. In this regard, the TDD system assumes that channels of UL and DL are the same. Thus, the TDD system does not have to feedback a PMI for an antenna port belonging to each BS and the BS can select an appropriate PM from a received signal SRS. However, also in this situation, channel information between two BS channels may be required. This is because it is difficult to accurately measure a phase difference between two BSs due to errors in sampling timing and clock caused during a separate operation of a receiver or a difference in propagation delay to the two BSs even if the receiver receives an SRS transmitted from one UE, from the two BSs.

Thus, in the TDD system, when a single CSI-RS configuration is applied to a CoMP set, a BS (e.g., the first BS) in a serving cell may determine 2-port CSI-RS configurations and signal the 2-port CSI-RS configurations to the UE. When the first BS transmits one port of the 2-port and the second BS transmits the other one port, if the aforementioned embodiments are applied, CQI of a channel between each BS and a UE as well as a channel difference between the two BSs may be reported to the BS (e.g., the first BS) in the serving cell. In other words, for example, for CSI-RS transmission of each BS, the BS (e.g., the first BS) in the serving cell may signal CSI-RS configuration 0 of the 2-port CSI-RS configurations to the UE and additionally determine the first BS and the second BS for CSI-RS configuration 2 to signal the CSI-RS configuration 2 to the UE. In addition, when different CSI-RS configurations are applied to BSs in a CoMP set, a structure according to the present invention may be simplified to transmit information about a phase difference only and thus, CSI feedback can be effectively performed.

Referring to FIGS. 5 and 8, the UE may be connected to the first BS eNB1 including 4 antenna ports and the second BS eNB2 including 4 antenna ports and may receive CSI-RSs from the BS and the second BS. The BSs may be allocated by CSI-RS configuration 0 (FIG. 8(a)) of the 8-port CSI-RS configurations or CSI-RS configurations 0 and 4 (FIG. 8(b)) of the 4-port CSI-RS configurations to indicate antenna ports.

In a CoMP system including a plurality of antenna ports, it may be advantageous in terms of improved performance of a network to transmit a PDSCH to some UEs at high transmission power and to transmit to the remaining UEs at low power according to scheduling. For example, referring to FIG. 8(a), it may be advantageous in terms of improved network performance to transmit a PDSCH by antenna ports 0 to 3 of the first BS for transmitting a CSI-RS on CSI-RS configuration 0 at different transmission power. In this case, the UE may simultaneously receive CSI-RS resources with different power.

When some antenna ports use high transmission power and some other antenna ports use low transmission power, UEs of the antenna ports (low power antenna ports hereafter) using low transmission power interfere with antenna ports (hereinafter, high power antenna ports) using high transmission power. However, when plural antenna ports transmit DL signals at different transmission powers, the UE cannot differentiate between a high power antenna port and a low power antenna port among the plural antenna ports and thus cannot accurately estimate a channel state of the antenna ports. A network performs scheduling based on CSI feedback by the UE and thus accurate CSI estimation is crucial to network performance.

Thus, the present invention proposes that RS power information about a plurality of antenna ports is transmitted to a UE for accurate channel estimation of the UE of CoMP. The power information may be information indicating a power ratio between RS and data signal per antenna port. For example, the BS may notify the UE of power information indicating a ratio of PDSCH EPRE to energy per resource element (CSI-RS EPRE) (hereinafter, $P_C$) per antenna port. In other words, the BS may notify the UE of a ratio of data transmission power to transmission power of CSI-RS transmitted by each antenna port of the BS. According to another embodiment of the present invention, a network (or a BS) may notify the UE of power information per antenna group that is divided according to a predetermined reference. For example, the BS may notify corresponding $P_C$ information per group including antenna ports having the same $P_C$. Referring to FIG. 8(a), one the assumption that antenna ports 0 to 3 of the first BS have different transmission power classes, the BS may transmit power information about the different transmission classes of the antenna ports 0 to 3 to a UE that accesses the BS. The power information ($P_C$) may be a higher layer signal such as RRC and so on transmitted to the UE.

For example, the BS may transmit $P_C$ information {3, 0} and bitmap information {1, 0, 0, 0} about the different transmission classes of the antenna ports 0 to 3 to the UE. The UE can know that the first BS applies 3 dB $P_C$ to the antenna port 1 and applies 0 dB Pc, based on the bitmap information and the Pc information. In other words, when antenna port 0 transmits a CSI-RS at 2:1 as a ratio of CSI-RS RE transmission power to PDSCH RE transmission power and antenna ports 1 to 3 transmit a CSI-RS at 1:1, the UE may calculate CSI on the assumption that PDSCH RE and CSI-RS RE from antenna port 0 are transmitted with a difference of 3 dB and calculate CSI on the assumption that PDSCH RE and CSI-RS RE from antenna ports 1 to 3 are transmitted with the same intensity. That is, $P_C$ refers to a ratio of PDSCH EPRE to CSI-RS EPRE, assumed when the UE causes CSI feedback. $P_C$ may have any one value within a predetermined range. For example, $P_C$ may have any one value from −8 dB to 15 dB in increments of 1 dB.

It may be advantageous in terms of improved network performance to allow a change in PDSCH transmission power according to a subframe. For example, a specific antenna port may be configured to transmit a PDSCH in an odd subframe at high transmission power and to transmit a PDSCH in an even subframe at low transmission power. As another example, the antenna port may be configured to transmit a DL signal in corresponding subframes of specific subframes at low transmission power in order to remove interference between adjacent cells. When a network is managed such that transmission power varies according to a subframe, each antenna port may have two or more $P_C$s. With regard to antenna ports having transmission power that varies according to a subframe, that is, according to time, the BS may notify the UE of a plurality of Pcs applied to the corresponding to the corresponding antenna ports. The UE may apply $P_C$ corresponding to the corresponding subframe (s) among the plural $P_C$s to derive/estimate CSI about the corresponding subframe(s).

According to embodiments of the present invention, $P_C$ may be a ratio of PDSCH RE transmission power to CSI-RS RE transmission power per CSI-RS port.

According to one of the aforementioned embodiments, the UE may derive CSI about a DL channel between the plural antenna ports and the UE and transmit the CSI to the BS. Alternatively, the UE may derive CSIs about DL channels between each of the plural antenna ports and the UE and transmit the CSIs to the BS.

An existing system only provides parameters of one non-zero CSI-RS configuration per cell to a UE. However, according to embodiments of the present invention, parameters of a plurality of (non-zero) CSI-RS configurations may be simultaneously provided to the UE and a plurality of power parameters of one (non-zero) CSI-RS configuration may be provided to the UE. Thus, according to embodiments of the present invention, a UE that receives a signal from a plurality of antenna ports may more accurately estimate channel states of the plural antenna ports. Accordingly, the BS may more accurately recognize DL channel states of antenna ports controlled by the BS, thereby improving overall network performance.

Figure 10:
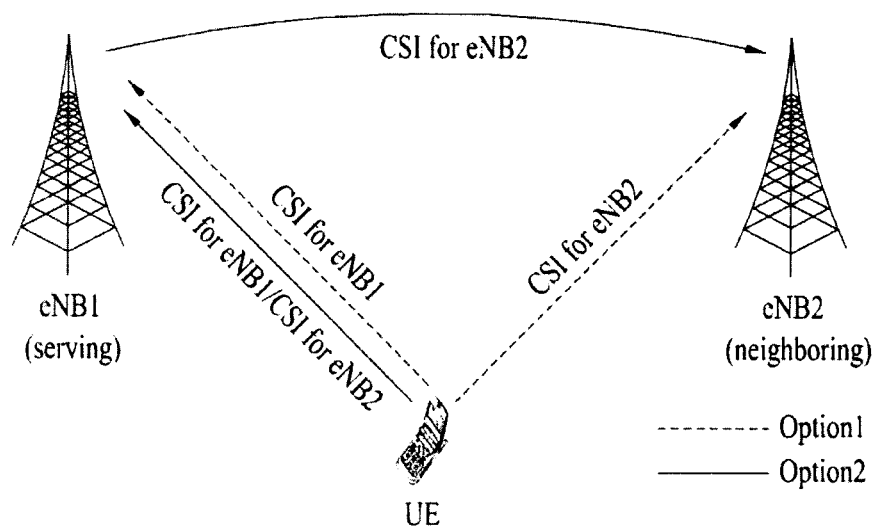
FIG. 10 illustrates a feedback method of channel state information according to an embodiment of the present invention.

FIG. 10 illustrates a feedback method of channel state information in a CoMP set including two BSs. For example, CSI feedback (i.e., CQI, PMI, RI, etc.) of channels of BSs included in a CoMP set is transmitted in the form obtained by simply extending a CSI feedback structure of a single BS. In this case, a path for transmitting CSI feedback of the channels by the UE may vary according to presence of a radio channel between the UE and the BS.

When a radio channel between the UE and all BSs in a CoMP set is present, the UE may transmit CSI feedback directly to each BS using the radio channel (option 1). On the other hand, if the radio channel is not present, the UE transmits CSI feedback of the CoMP set to the first BS and the first BS transmits CSI feedback information of the second BS via backhaul (option 2). According to the present invention, in a CoMP system of FIG. 10, BSs (eNB1 and eNB2) do not have to be configured as different cells. As necessary, the BSs may be configured in the form of separate antenna ports having the same cell ID of a single cell.

Figure 11:
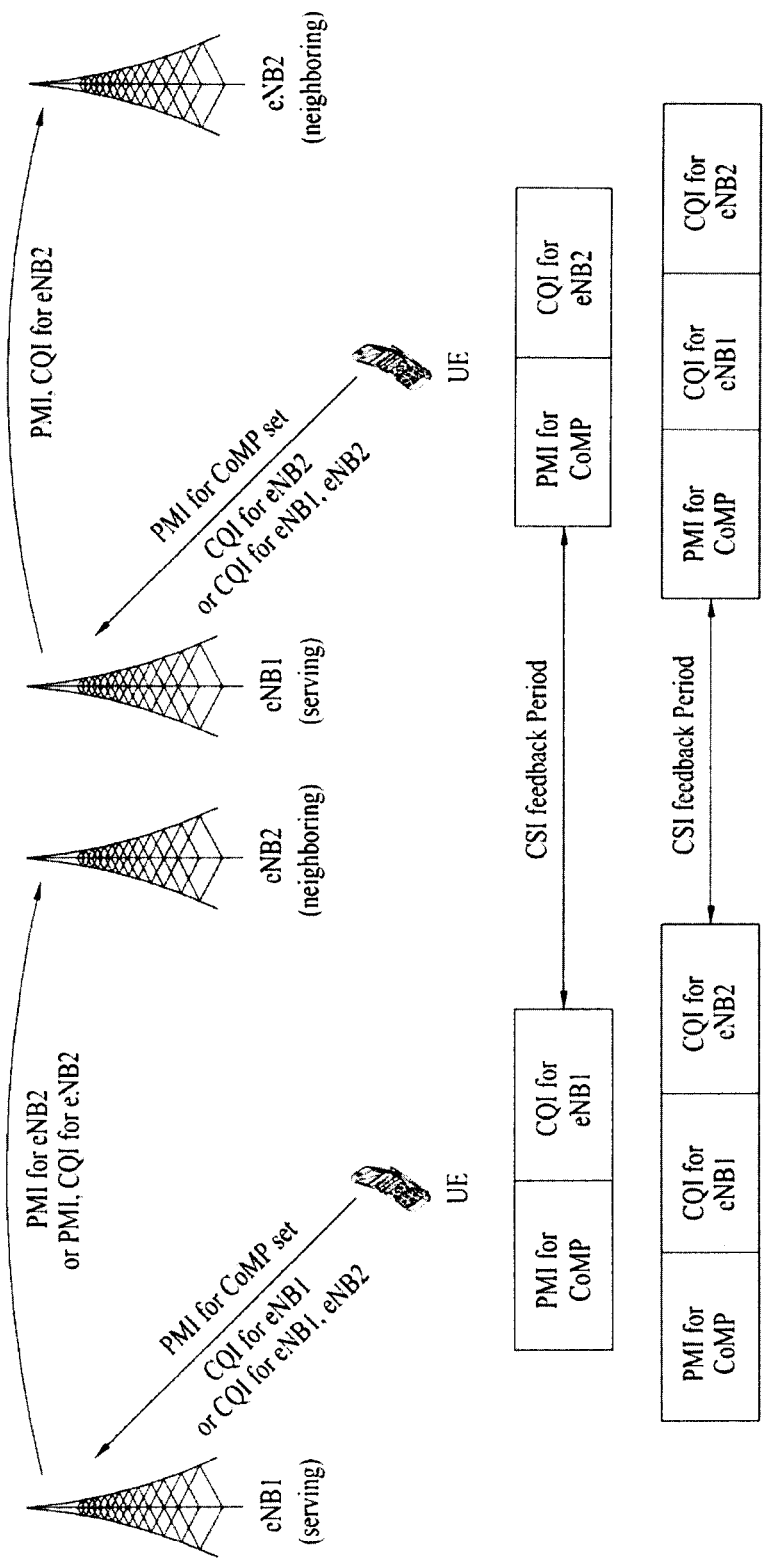
FIG. 11 illustrates an exemplary CSI feedback according to an embodiment of the present invention.

FIG. 11 illustrates an exemplary CSI feedback structure for transmitting PMI and CQI derived from a UE to a BS. Referring to FIG. 11, an embodiment of the present invention proposes several examples of the CSI feedback structure for transmitting the derived PMI and CQI.

When a single CSI-RS configuration is applied to a CoMP set, a plurality of CQIs are involved in each other for one PMI unlike a conventional method in which one CQI is transmitted for one PMI, and thus, a new CSI feedback structure for transmitting the involved CQIs is required. In this regard, the CSI feedback structure illustrated in FIG. 11 may be considered.

FIG. 11 illustrates two transmission methods of CSI feedback including a single PMI and a plurality of CQIs. In a first method, a single PMI of a CoMP set is always transmitted every CSI feedback transmission point of time, whereas CQIs of BSs are alternately and equally transmitted. In other words, with regard to CSI feedback transmission points, the PMI of the CoMP set and first CQI of the first BS are transmitted at a first point in time and the PMI of the CoMP set and second CQI of the second BS are transmitted at a second point in time. This method considers the properties in which the PMI is sensitive to time variation, whereas the CQI has robustness with respect to time variation. Thus, the method is advantageous that additional resources are not required compared with CSI feedback for a single BS.

A second method is a method in which a single PMI and CQI of each BS are simultaneously transmitted every CSI feedback transmission point and requires additional resources therefor. In this case, feedback information about the CQI may be compressed and transmitted. For example, when first CQI and second CQI of two BSs are calculated, the first CQI may be quantized and transmitted using a general method, and only a difference value between the second CQI and the first CQI may be transmitted.

The aforementioned two methods may be similarly applied to the case in which different CSI-RS configurations are applied to BSs in a CoMP set. That is, according to the first method, the UE may transmit all PMIs of the BSs and compensation values thereof (e.g., a phase difference) every transmission point in time and CQI per BS may be equally and alternately transmitted. In this case, CQI per BS refers to a value estimated from different CSI-RS configurations allocated to the BSs.

According to the second method, the UE may transmit PMI related information and CQI of each BS using additional CSI feedback resources every transmission point.

When a communication using these CSI feedback methods is a TDD system, information about a PMI of each BS can be estimated via an SRS and thus, it is sufficient to transmit only inter-point CSI (e.g., a phase difference, etc.). Thus, the first method is a method in which the inter-point CSI is transmitted every transmission point and CQIs are alternately transmitted, and the second method is a simplified method in which the inter-point CSI and all CQIs are transmitted every transmission point.

Figure 12:
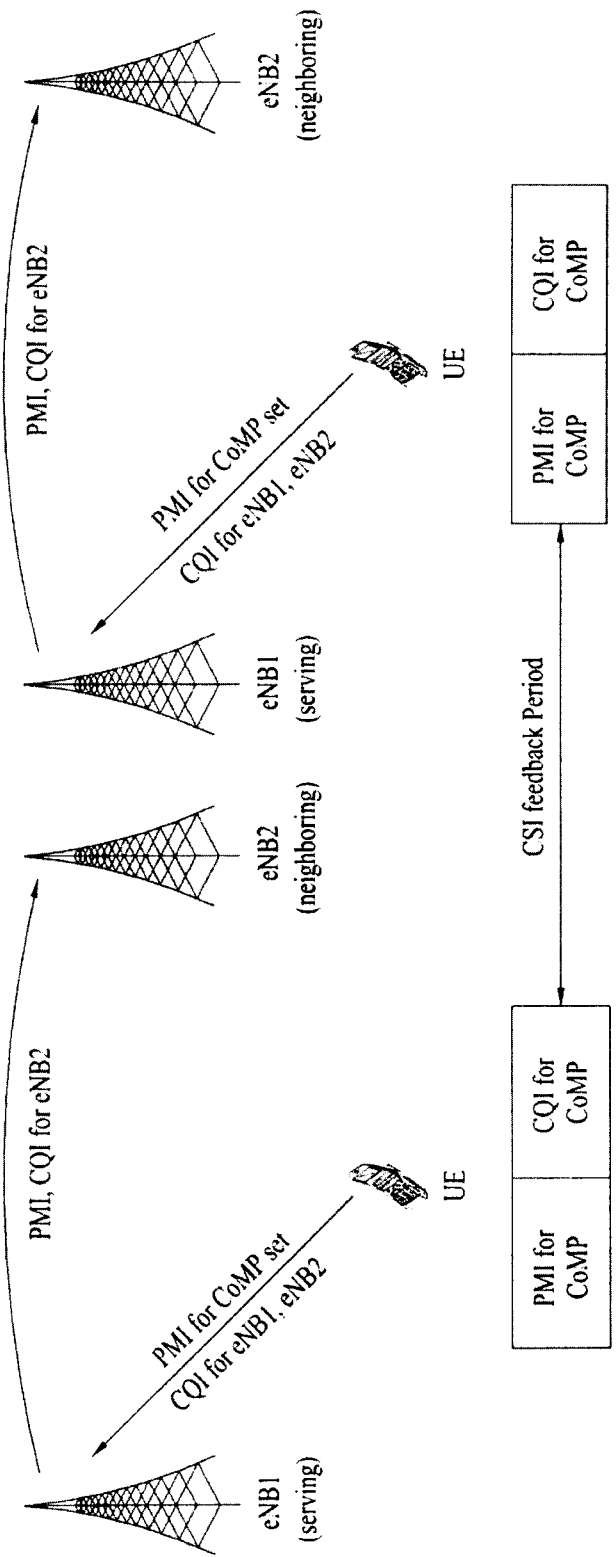
FIG. 12 illustrates an exemplary CSI feedback according to an embodiment of the present invention.

In the case of a TDD system, channel information can be restored via the inter-point CSI and the PMI per BS, estimated through an SRS and thus, CQI can be calculated only when information about additional noise power is present. Thus, in this case, the transmitted CQI can be simplified to single CQI about noise, and this CSI feedback structure is shown in FIG. 12. A structure formed by modifying single CQI to CQI using a JT scheme may be applied when a specific scheme such as JT is used. That is, as illustrated in FIG. 12, the CQI may be expressed by single CQI for a CoMP set.

Figure 13:
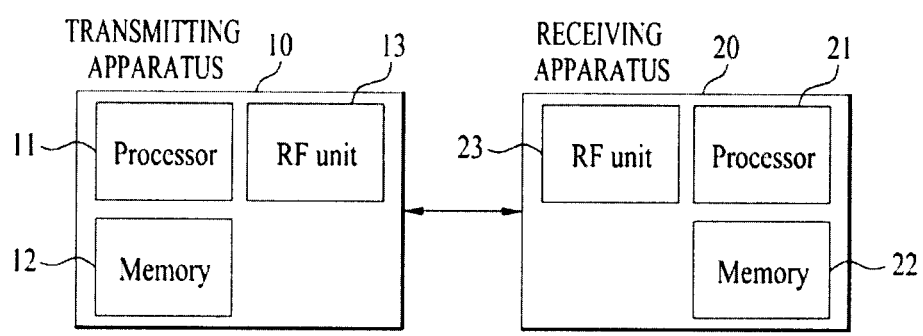
FIG. 13 is a block diagram illustrating components of a transmitting apparatus and a receiving apparatus that execute an embodiment of the present invention.

FIG. 13 is a block diagram illustrating components of a transmitting apparatus 10 and a receiving apparatus 20 that execute the present invention.

The transmitting apparatus 10 and the receiving apparatus 20 include a radio frequency (RF) units 13 and 23 for transmitting or receiving a radio signal carrying information and/or data, a signal, a message, etc. memories 12 and 22 for storing various information related communication in a wireless communication system, and processors 11 and 21 that are operationally connected to components such as the RF units 13 and 23, the memories 12 and 22, and so on and control the RF units 13 and 23 and the memories 12 and 22 to perform at least one of the aforementioned operations according to the embodiments of the present invention, respectively.

The memories 12 and 22 may store programs for processing and control of the processors 11 and 21 and may temporarily store input/output information. The memories 12 and 22 may serve as a buffer.

In general, the processors 11 and 21 control an overall operation of various modules in the transmitting apparatus 10 or the receiving apparatus 20. In particular, the processors 11 and 21 may perform various control functions for executing the present invention. The processors 11 and 21 may also be called a controller, a microcontroller, a microprocessor, a microcomputer, etc. The processors 11 and 21 may be embodied by hardware, firmware, software, or a combination thereof. When the present invention is implemented by a hardware configuration, application specific integrated circuits (ASICs), digital signal processors (DSPs), digital signal processing devices (DSDPs), programmable logic devices (PLDs), field programmable gate arrays (FPGAs), etc., which are configured to implement the present invention, may be included in the processors 11 and 21. When the present invention is implemented by a firmware or software configuration, firmware or software may be configured to include a module, a process, a function, etc. for executing functions or operations according to the present invention. The firmware or software configured to implement the present invention may be included in the processors 11 and 21 or stored in the memories 12 and 22 and driven by the processors 11 and 21.

The processor 11 of the transmitting apparatus 10 is scheduled by a scheduler connected to the processor 11 or the processor 11, performs predetermined coding and modulation on signals and/or data to be externally transmitted, and transmits the signals and/or data to the RF unit 13. For example, the processor 11 converts a data stream to be transmitted into K layers via demultiplexing, channel coding, scrambling, modulation, etc. The coded data stream is also referred to as a codeword and is equivalent to a transport block (TB) that is a data block provided by a medium access control (MAC) layer. One TB is coded to one codeword that is transmitted to the receiving apparatus 20 in the form of one or more layers. For frequency up-conversion, the RF unit 13 may include an oscillator. The RF unit 13 may include Nt (Nt is a positive integer) transmission antennas.

A signal processing process of the receiving apparatus 20 is opposite to that of the transmitting apparatus 10. Under control of the processor 21, the RF unit 23 of the receiving apparatus 20 receives a radio signal transmitted from the transmitting apparatus 10. The RF unit 23 may include Nr (Nr is a positive integer) receiving antennas. In addition, the RF unit 23 frequency down-converts each signal received by the receiving antennas to restore a baseband signal. For frequency down-conversion, the RF unit 23 may include an oscillator. The processor 21 may perform decoding and demodulation on a radio signal received by a receiving antenna to restore data to be originally transmitted by the transmitting apparatus 10.

Each of the RF units 13 and 23 includes one or more antennas. According to an embodiment of the present invention, under control of the processors 11 and 21, an antenna transmit signals processed by the RF units 13 and 23, receives a radio signal from an external source, and transmits the radio signal to the RF units 13 and 23. An antenna is also referred to as an antenna port. Each antenna may correspond to one physical antenna or may be configured by a combination of a plurality of physical antenna elements. A signal transmitted from each antenna cannot be decomposed any more by the receiving apparatus 20. An RS transmitted to correspond to a corresponding antenna defines an antenna as for the receiving apparatus 20. Regardless of whether a channel is a single radio channel from one physical antenna or a composite channel from a plurality of physical antenna elements including the antenna, the RS may allow the receiving apparatus 20 to estimate the channel of the antenna. That is, the antenna is defined such that a channel carrying a symbol on the antenna is derived from the channel to which another symbol on the antenna is transmitted. An RF unit for supporting a multi-input multi-output (MIMO) function using a plurality of antennas may be connected to two or more antennas.

According to the embodiments of the present invention, a UE or a relay operates as the transmitting apparatus 10 in UL and operates as the receiving apparatus 20 in DL. According to the embodiments of the present invention, a BS operates as the receiving apparatus 20 in UL and operates as the transmitting apparatus 10 in DL.

Hereinafter, with regard to embodiments of the present invention, a processor, a memory, and an RF unit included in the BS will be referred to as a BS processor, a BS memory, and a BS RF unit, respectively, and a processor, a memory, and an RF unit included in the UE will be referred to as a UE processor, a UE memory, and a UE RF unit, respectively. According to the present invention, the BS processor may be a processor located in the BS or a BS controller that is connected to the BS via a cable or a specialized line to control the BS.

The BS processor may allocate a single CSI-RS configuration (or a single CSI-RS subframe configuration) or different CSI-RS configurations (or different CSI-RS subframe configurations) to a plurality of antenna ports of the BS that communicates with the UE. In addition, the BS processor may allocate DL transmission power to the plural antenna ports and allocate transmission power to each of the plural antenna ports. Thus, the plural antenna ports may use the same or different transmission power or some antenna ports may use the same transmission power.

Throughout this specification, information about a CSI-RS configuration, a CSI-RS subframe configuration, and/or the CSI-RS transmission power for a CSI-RS to be transmitted by the BS is referred to as CSI-RS information. In more detail, the CSI-RS transmission power information may include CSI-RS transmission power information to be transmitted by a plurality of antenna ports of at least one BS. In addition, the CSI-RS transmission power information of the plural antenna ports may be power information corresponding to a ratio of data transmission power to CSI-RS transmission power of the antenna port, as described above.

The BS processor may control the BS RF unit to transmit the CSI-RS information to the UE. the CSI-RS transmission power information (hereinafter, power information) of the CSI-RS information may be information indicating a power ratio between RS and data signal per antenna port. For example, the power information may indicate a ratio of PDSCH EPRE to energy per resource element (CSI-RS EPRE) (hereinafter, $P_C$) per antenna port. In addition, the power information may be power information per antenna port group categorized according to a predetermined reference. The power information may be transmitted to the UE via a higher layer signal such as RRC, etc. In addition, when antennae port(s) allocated for CSI-RS transmission transmits the CSI-RS at zero power, the BS processor may transmit information about an antenna port, transmitted at zero power, to the UE connected to the BS. That is, the BS may inform the UE of an antenna port that transmits the CSI-RS at zero power. This operation performed on the UE by the BS may be applied to both cases in which one BS serves one UE and a plurality of BSs serves one UE. Information about the zero power port may be transmitted to the UE via a higher layer signal. The zero power transmission port for the CSI-RS may be used for data transmission or interference measurement.

The UE processor may control the UE RF unit to receive CSI-RS information about a plurality of antenna ports of at least one BS that the UE accesses, from the BS. The CSI-RS information may include a CSI-RS configuration, a CSI-RS subframe configuration, and/or the CSI-RS transmission power for a CSI-RS to be transmitted by the BS The UE processor may know a CSI-RS resource of a subframe that receives a CSI-RS based on the CSI-RS and know CSI-RS transmission power used in each of the plural antenna ports.

The UE processor may receive the CSI-RS from the plural antenna ports through the corresponding CSI-RS resource based on the CSI-RS and acquire CSI about DL between the UE and the plural antenna ports based on the CSI-RS transmission power transmitted by each antenna port and the received CSI-RS. The UE processor may allow the UE RF unit to transmit the acquired CSI to at least one BS.

The aforementioned embodiments of the present invention propose CSI estimation or calculation and a CSI feedback structure in a CoMP system so as to improve accuracy of channel state estimation in the CoMP, thereby optimizing overall performance of a communication system. In addition, according to the aforementioned embodiments of the present invention, when power information per antenna port is used, a channel state of DL between a BS and a UE can be more accurately estimated.

In addition, it would be obvious to one of ordinary skill in the art that the present invention can be applied to a communication system using communication schemes as well as to the CoMP system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a base station (BS), a user equipment (UE), or other equipments in a wireless communication system.

The invention claimed is:

1. A method of transmitting channel state information (CSI) for a CoMP (coordinated multi-point transmission and reception) set comprising a plurality of eNodeBs, the method performed by a user equipment (UE) and comprising;
receiving, from respective eNodeBs of the plurality of eNodeBs of the CoMP set, channel state information reference signals (CSI-RSs) according to a single CSI-RS configuration for the CoMP set,
wherein the single CSI-RS configuration includes mapping information between CSI-RS resource elements and antenna port(s) of a respective one of the plurality of eNodeBs;
receiving, from the serving eNodeB, information about CSI-RS transmission power used for each of a plurality of antenna ports of the plurality of eNodeBs to transmit CSI-RSs;
calculating the CSI for the CoMP set using the received information about CSI-RS transmission power and the received CSI-RSs, the calculated CSI including multiple channel quality indicators (CQIs) and a single precoding matrix indicator (PMI) corresponding to the single CSI-RS configuration,
wherein each of the multiple CQIs corresponds to respective one of the plurality of eNodeBs of the CoMP set and the single PMI is a precoding matrix that is closest to an optimum precoding matrix obtained by compensating phase differences for the received CSI-RSs; and
transmitting the calculated CSI to the serving eNodeB.

2. The method according to claim 1, wherein the power information about the plurality of antenna ports comprises a ratio of downlink (DL) data transmission power to CSI-RS transmission power of each antenna port.

3. The method according to claim 1, wherein the power information about each of the plurality of antenna ports is received via a higher layer signal.

4. The method according to claim 1, wherein the receiving the power information comprises receiving information about an antenna port which is configured to transmit CSI-RS at zero power, from the serving eNodeB.

5. A user equipment (UE) for transmitting channel state information (CSI) for a CoMP (coordinated multi-point transmission and reception) set comprising a plurality of eNodeBs, the UE comprising:
a radio frequency (RF) unit configured to transmit or receive a radio signal; and
a processor operatively connected to the RF unit and configured to:
receive, from respective eNodeBs of the plurality of eNodeBs of the CoMP set, channel state information reference signals (CSI-RSs) according to a single CSI-RS configuration for the CoMP set,
wherein the single CSI-RS configuration includes mapping information between CSI-RS resource elements and antenna port(s) of a respective one of the plurality of eNodeBs,
receive, from the serving eNodeB, information about CSI-RS transmission power used for each of a plurality of antenna ports of the plurality of eNodeBs to transmit CSI-RSs,
calculate the CSI for the CoMP set using the received information about CSI-RS transmission power and the CSI-RSs, the calculated CSI including:
multiple channel quality indicators (CQIs) and a single precoding matrix indicator (PMI) corresponding to the single CSI-RS configuration,
wherein each of the multiple CQIs corresponds to respective one of the plurality of eNodeBs of the CoMP set and the single PMI is a precoding matrix that is closest to an optimum precoding matrix obtained by compensating phase differences for the received CSI-RSs, and
transmit the calculated CSI to the serving eNodeB.

6. The UE according to claim 5, wherein the power information about the plurality of antenna ports comprises a ratio of downlink (DL) data transmission power to CSI-RS transmission power of each antenna port.

7. The UE according to claim 5, wherein the power information about each of the plurality of antenna ports is received via a higher layer signal.

8. The UE according to claim 5, wherein the processor is configured to control the RF unit to receive information about an antenna port which is configured to transmit CSI-RS at zero power, from the serving eNodeB.

9. A method for receiving channel state information (CSI) for CoMP (coordinated multi-point transmission and reception) set comprising a plurality of eNodeBs from a user equipment (UE), the plurality of eNodeBs including the eNodeB, the method comprising:
transmitting, by the eNodeB to the UE, information about channel state information reference signal (CSI-RS) transmission power used for each of a plurality of antenna ports of the eNodeB to transmit a CSI-RS;

transmitting, by the eNodeB to the UE, a CSI-RS according to a single CSI-RS configuration for the CoMP set and according to the information about the CSI-RS transmission power; and receiving the CSI for the CoMP set from the UE, the CSI calculated based on the information about CSI-RS transmission power and CSI-RSs received by the UE from the plurality of eNodeBs of the CoMP set, the received CSI-RSs including the CSI-RS transmitted by the eNodeB, the calculated CSI including:

multiple channel quality indicators (CQIs) and a single precoding matrix indicator (PMI) corresponding to the single CSI-RS configuration, wherein the single CSI-RS configuration includes mapping information between CSI-RS resource elements and antenna port(s) of a respective one of the plurality of eNodeBs, and wherein each of the multiple CQIs corresponds to respective one of the plurality of eNodeBs of the CoMP set and the single PMI being a precoding matrix that closest to an optimum precoding matrix obtained by compensating phase differences for the received CSI-RSs.

10. The method according to claim 9, wherein the power information about the plurality of antenna ports comprises a ratio of downlink (DL) data transmission power to CSI-RS transmission power of each antenna port.

11. An eNodeB for receiving channel state information (CSI) for CoMP (coordinated multi-point transmission and reception) set comprising a plurality of eNodeBs from the UE, the plurality of eNodeBs including the eNodeB, the eNodeB comprising:

a radio frequency (RF) unit configured to transmit or receive a radio signal; and a processor operatively connected to the RF unit and configured to:

transmit, to the UE, information about channel state information reference signal (CSI-RS) transmission power used for each of a plurality of antenna ports of the eNodeB to transmit a CSI-RS, transmit, by the eNodeB to the UE, a single CSI-RS according to a CSI-RS configuration for the CoMP set and according to the information about the CSI-RS transmission power, and receive, from the UE, the CSI for the CoMP set, the CSI calculated based on the information about the CSI-RS transmission power and CSI-RSs received by the UE from the plurality of eNodeBs of the CoMP set, the received CSI-RSs including the CSI-RS transmitted by the eNodeB, the calculated CSI including:

multiple channel quality indicators (CQIs) and a single precoding matrix indicator (PMI) corresponding to the single CSI-RS configuration, wherein each of the multiple CQIs corresponds to respective one of the plurality of eNodeBs of the CoMP set and the single PMI is a precoding matrix that closest to an optimum precoding matrix obtained by compensating phase differences for the received CSI-RSs, and wherein the single CSI-RS configuration includes mapping information between CSI-RS resource elements and antenna port(s) of a respective one of the plurality of eNodeBs.

12. The eNodeB according to claim 11, wherein the power information about the plurality of antenna ports comprises a ratio of downlink (DL) data transmission power to CSI-RS transmission power of each antenna port.

* * * * *